United States Patent
Shcherbina et al.

(10) Patent No.: US 12,517,835 B2
(45) Date of Patent: Jan. 6, 2026

(54) CACHE OPERATION IN DATA PROCESSING SYSTEMS

(71) Applicant: Arm Limited, Cambridge (GB)

(72) Inventors: Nikolai Shcherbina, Trondheim (NO); Inge Edward Halsaunet, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/358,999

(22) Filed: Jul. 26, 2023

(65) Prior Publication Data

US 2024/0037040 A1 Feb. 1, 2024

(30) Foreign Application Priority Data

Jul. 29, 2022 (GB) .................................. 2211109

(51) Int. Cl.
*G06F 12/08* (2016.01)
*G06F 12/0842* (2016.01)
*G06F 12/0895* (2016.01)

(52) U.S. Cl.
CPC ...... *G06F 12/0895* (2013.01); *G06F 12/0842* (2013.01); *G06F 2212/1021* (2013.01)

(58) Field of Classification Search
CPC .. G06F 12/023; G06F 12/0238; G06F 12/128; G06F 2212/1021; G06F 2212/7201; G06F 2212/283
See application file for complete search history.

(56) References Cited

U.S. PATENT DOCUMENTS

| | | | | |
|---|---|---|---|---|
| 10,726,607 | B1* | 7/2020 | Guirado | G06F 9/3877 |
| 2002/0060684 | A1* | 5/2002 | Alcorn | G06T 15/04 345/557 |
| 2015/0187043 | A1* | 7/2015 | Shebanow | G06F 12/0893 345/543 |
| 2018/0239702 | A1* | 8/2018 | Farmahini Farahani | G06F 12/0813 |
| 2022/0027283 | A1* | 1/2022 | Uhrenholt | G06F 12/0886 |
| 2022/0405209 | A1* | 12/2022 | ChoFleming | G06F 12/0811 |
| 2023/0153234 | A1* | 5/2023 | Duan | G06F 12/0246 711/154 |

* cited by examiner

*Primary Examiner* — Tracy C Chan
(74) *Attorney, Agent, or Firm* — Pearl Cohen Zedek Latzer Baratz LLP

(57) ABSTRACT

In a data processing system comprising a first cache operable to store data for use when performing a data processing operation, and a second cache operable to store data required for fetching data into the first cache from memory, when it is determined that there is no entry for data for a data processing operation in the first cache, an entry in the first cache is allocated for the required data, and information that indicates an entry in the second cache for data required for fetching the required data is stored in the tag portion of the allocated entry. Then, once a request has been sent to a memory system for the required data, the information in the tag portion for the allocated entry in the first cache that indicates an entry in the second cache is replaced with information indicative of an address for the data required for fetching the required data.

19 Claims, 8 Drawing Sheets

|  | DESC | |
|---|---|---|
| di | state | da |
| 0x0 | VALID | 0x4444 |
| 0x1 | VALID | 0x4531 |
| 0x2 | INVALID | 0x5673 |
| 0x3 | VALID | 0x4445 |
| 0x4 | INVALID | 0x3456 |
| 0x5 | VALID | 0x3454 |
| ... | | |
| 0Xf | VALID | 0x3324 |

500 DATAC

| state | offset | da (rest) | da/di |
|---|---|---|---|
| REQUESTED | 0x111 | 0x332 | 0x4 |
| VALID | 0x234 | 0x444 | 0x5 |
| VALID | 0x455 | 0x567 | 0x3 |
| VALID | 0x456 | 0x567 | 0x3 |
| ... | | | |
| VALID | 0x355 | 0x453 | 0x1 |

|  | DESC | |
|---|---|---|
| di | state | da |
| 0x0 | VALID | 0x4444 |
| 0x1 | VALID | 0x4531 |
| 0x2 | INVALID | 0x5673 |
| 0x3 | VALID | 0x4445 |
| 0x4 | INVALID | 0x3456 |
| 0x5 | VALID | 0x3454 |
| ... | | |
| 0Xf | VALID | 0x3324 |

500 DATAC

| state | offset | da (rest) | da/di |
|---|---|---|---|
| VALID | 0x111 | 0x332 | 0x4 |
| VALID | 0x234 | 0x444 | 0x5 |
| VALID | 0x455 | 0x567 | 0x3 |
| VALID | 0x456 | 0x567 | 0x3 |
| ... | | | |
| VALID | 0x355 | 0x453 | 0x1 |

CACHE OPERATION IN DATA PROCESSING SYSTEMS

BACKGROUND

The technology described herein relates to data processing systems and in particular to cache operation in data processing systems.

Many data processing systems use caches to store data, etc., locally to a processing unit or units so as to reduce the need to fetch data from slower data stores, such as main memory of the data processing system.

In such arrangements, it will first be determined whether the data is available in the appropriate cache. If the data is present in the cache (there is a cache "hit"), then the data will be read from the cache, rather than from the main data store where it is stored, thereby allowing the processing operation to proceed more rapidly.

On the other hand, if the data is not present in the cache (there is a cache "miss"), then the process will operate to first load (fetch) the relevant data into the cache, with the processing operation being stalled until the relevant data has been fetched into the cache.

There can be situations in which further data from memory is needed in order to be able to fetch data into a cache and this further data may itself be cached and so subject itself to the risk of a cache miss occurring. This may be the case, for example, where the memory address for data to be fetched into a cache for a data processing operation is dependent on further data that may be cached, such that the memory address for fetching the data into the first cache cannot be determined until the further address indicating data has been obtained from its cache.

An example of this is when performing texturing operations in graphics processing systems.

Texturing in graphics processing systems will use desired texture sample (texel) data, which may be cached in a texture (texel) cache. The texture samples (texels) will come from appropriate texture planes (arrays) stored in memory. The memory address for a given texture sample (texture data element (texel)) for use in a graphics texturing operation may accordingly depend on both the position within the texture (texture plane) of the desired texture sample (texel) to be fetched, and which texture (texture plane) that texture sample is to be fetched from.

In this case in order to be able to fetch a texel from memory into the texel cache, the full address of the texel, which must be determined before making the memory request for the texel data, may be dependent not only on the texel coordinates, but also the texture plane in question.

In such arrangements, the texture plane information may be stored separately to the main texel cache, e.g. in a further cache that stores texture plane information (descriptors). In this case therefore, a line fetch for the texel cache will require a "hit" in the further cache that stores the texture plane information (descriptors) in order to be able to proceed (as the memory address for the texel cache line fetch will require the texture plane information in order to be able to determine the complete address for the desired texel data in the memory).

The Applicants believe that there remains scope for improvements to cache operation in arrangements in which the fetching of data into one cache requires data from another cache.

BRIEF DESCRIPTION OF THE DRAWINGS

Various embodiments will now be described, by way of example only, and with reference to the accompanying drawings in which:

FIGS. 5A-5D show example cache content in an embodiment of the technology described herein;

Like reference numerals are used for like components where appropriate in the drawings.

DETAILED DESCRIPTION

Figure 1:
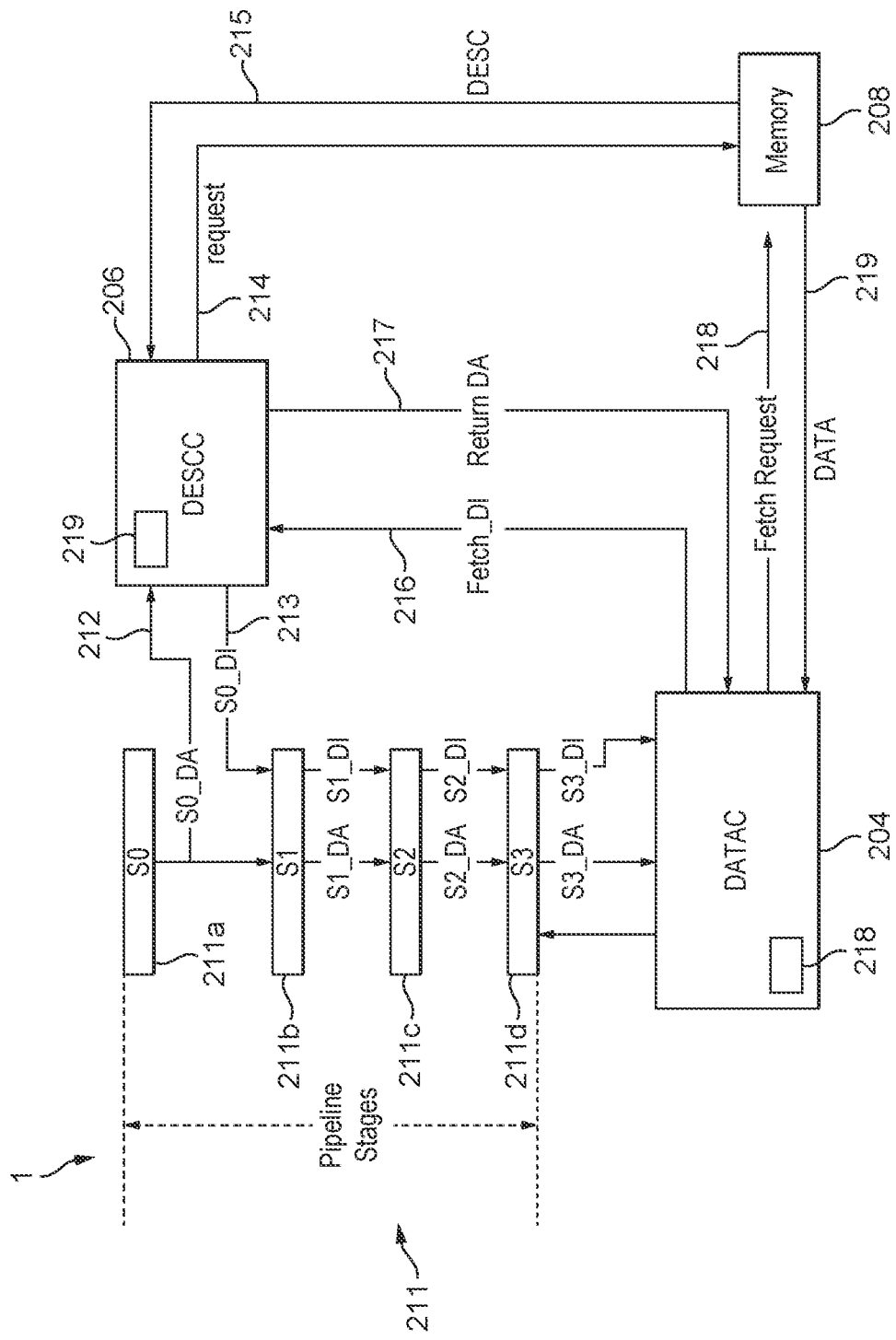
FIG. 1 shows schematically a data processing system in accordance with an embodiment of the technology described herein.

A first embodiment of the technology described herein comprises a method of operating a data processing system, the data processing system comprising:

a data processing circuit operable to perform a data processing operation;

a first cache operable to store data for use by the data processing circuit when performing a data processing operation; and a second cache operable to store data required for fetching data for use in a data processing operation into the first cache from memory;

wherein the first cache and the second cache each store one or more entries, wherein each entry includes a data portion and a tag portion, the tag portion for storing information for the entry in the cache that acts as an identifier for the entry in the cache;

the method comprising:

when it is determined in response to a request for data for a data processing operation that there is no entry for that data in the first cache:

allocating an entry in the first cache for the requested data, and storing in the tag portion of the allocated entry information that indicates an entry in the second cache for data required for fetching the requested data;

reading from the second cache the data required for fetching the requested data;

after the data required for fetching the requested data has been read from the second cache: sending a request towards a memory system of the data processing system for the requested data, and replacing the information in the tag portion for the allocated entry in the first cache that indicates an entry in the second cache for data required for fetching the requested data with information indicative of an address for the data required for fetching the requested data; and once the requested data has been returned to the first cache, storing it in the data portion of the allocated entry in the first cache.

A second embodiment of the technology described herein comprises a data processing system comprising:

a data processing circuit operable to perform a data processing operation;

a first cache operable to store data for use by the data processing circuit when performing a data processing operation; and a second cache operable to store data required for fetching data for use in a data processing operation into the first cache from memory;
wherein
the first cache and the second cache each store one or more entries, wherein each entry includes a data portion and tag portion, the tag portion for storing information for the entry in the cache that acts as an identifier for the entry in the cache;
the data processing system further comprising at least one processing circuit configured to, when it is determined in response to a request for data for a data processing operation that there is no entry for that data in the first cache:
allocate an entry in the first cache for the requested data, and store in the tag portion of the allocated entry information that indicates an entry in the second cache for data required for fetching the requested data;
read from the second cache the data required for fetching the requested data;
after the data required for fetching the requested data has been read from the second cache: send a read request towards a memory system of the data processing system for the requested data, and replace the information in the tag portion for the allocated entry in the first cache that indicates an entry in the second cache for data required for fetching the requested data with information indicative of an address for the data required for fetching the requested data; and
once the requested data has been returned to the first cache, store it in the data portion of the allocated entry in the first cache.

The technology described herein relates to arrangements in which the fetching of data into a first (primary) cache is dependent on data that is stored in a second, different cache. That is, when new data is required in the first (primary) cache, data from the second (secondary) cache must first be obtained in order to determine, e.g. the full memory address for the required data, and fetch the data from memory.

The first cache and the second cache both comprise one or more (and in an embodiment a plurality of) entries, with each cache entry including a data portion for storing data and a tag portion for storing information that acts as an identifier for the entry in the cache. (The tag portion is thus used to identify the cache entry, e.g. so that read attempts in the cache can determine whether or not an entry for the required data is already present in the cache or not.)

In the technology described herein, when a cache miss occurs in the first, primary cache (i.e. an attempt to read the data that is required for a data processing operation from the first cache finds that there is no entry for the data required for the data processing operation in the first cache), an entry is allocated in the first, primary cache for the data in question.

The fetching of the data into the cache then involves a two-step process. Firstly, data from the second cache needed for the fetching of the requested data into the first cache is obtained. The required data is then fetched into the first, primary cache. This might be from main memory or from another cache intermediate the primary cache and main memory of the data processing system.

In the technology described herein, when an entry is allocated in the first, primary cache in response to a "miss" in that cache, the allocated entry is tagged (at least) with information that indicates the entry in the second cache for the data (that stores/will store the data) that is required for fetching the requested data.

Then, once the data that is required for fetching the requested data has been obtained from the second cache, a request for the requested data is sent towards the memory system, and the information in the tag portion in the allocated entry in the first cache indicating the entry in the second cache for the data that is required for fetching the requested data is replaced with information indicative of a (memory) address for the data required for fetching the requested data.

Thus, in the technology described herein, the same part of the tag portion of a cache entry in the first cache can (and does) store either information indicating an entry in the second cache, or information indicative of a location in memory, and in dependence upon the current state of the operation of fetching data into the first cache.

As will be discussed further below, the Applicants have recognised that this can provide a relatively simple and cost-effective mechanism for handling cache misses in arrangements in which the handling of a cache miss in a first, primary cache requires data from a further, secondary cache, and in a storage efficient manner. For example, it avoids the need to store both information indicating an entry in the second cache, and address information indicating a location in memory for data required for fetching the requested data in the tag portion of an entry in the first cache at the same time, but with less impact on the performance of the cache operation than other arrangements that may allow that.

The data processing operation that is being performed in the technology described herein and that will use data from the first cache can be any suitable and desired data processing operation that may be performed in a data processing system. As will be discussed in more detail below, in an embodiment, the data processing system is a graphics processing system, and so the data processing operation is in an embodiment a graphics processing operation, such as, and in an embodiment, a texturing (a texture mapping) operation. Other forms of data processing operation could, of course, also or instead be performed.

The caches in the technology described herein can be any suitable and desired cache memory. Correspondingly, the data that is fetched and loaded into the caches is in an embodiment stored in an appropriate storage of the data processing system and fetched from that storage, such as, and in an embodiment, an appropriate memory, e.g., and in an embodiment main memory, of the data processing system.

The first and second caches each store one or more, and in an embodiment a plurality of, entries (e.g., and in an embodiment, cache lines), with each entry including a data portion (which will store the actual data that the cache entry (line) relates to), and a tag portion (which stores information for the entry in the cache, including, inter alia, information that acts as an identifier for the cache entry).

Each entry in the first and second cache in an embodiment also has an associated "state" indication, indicating the current state of the entry. This will be discussed in more detail below.

The data that is required for the data processing operation and that is stored in the data portion of, and requested from, the first cache can be any suitable and desired data to be used in a data processing operation and will, accordingly, and in an embodiment, depend upon the nature of the data processing operation that is being carried out.

The tag portion of an entry in the first cache will in the technology described herein, as discussed above, (at least) alternately store information that indicates an entry in the second cache where data for fetching data into the cache entry in the first cache is stored, or information indicative of an address for the data required for fetching the requested data for the entry.

It will be appreciated in this regard that when the tag portion of entry in the first cache stores information that indicates an entry in the second cache where data for fetching data into the cache entry in the first cache is stored, the tag portion will thereby, in effect, identify the data required for fetching the requested data (only) in the second cache space, whereas when the tag portion of an entry in the first cache stores information indicative of an address for the data required for fetching the requested data for the entry, the tag portion will thereby, in effect, identify the data required for fetching the requested data in the "global" memory space.

The tag portion of an entry in the first cache could comprise solely this information, but in an embodiment, also includes further information, such as, and in an embodiment, other information indicative of an address of the data required for fetching the requested data that the cache entry is for.

Thus, in an embodiment, the tag portion of the first cache comprises a first part that stores (some) information indicative of an address (in memory) of data required for fetching the requested data that the entry is for, and a further, different part, that stores either: information that indicates an entry in the second cache where data required for fetching the data into the entry in the first cache is stored, or (some) information indicative of an address for the data required for fetching the requested data for the entry in the first cache (in the manner of the technology described herein).

In this case, in an embodiment, the first part of the tag portion stores some (but not all) of, such as, and in an embodiment, one or more, and in an embodiment plural, bits of, such as one or more MSBs (most significant bits) of, an (the) overall (memory) address for the data required for fetching the requested data that the entry is for, and the further, different part of the tag portion (that stores either information that indicates an entry in the second cache where data required for fetching the data into the entry in the first cache is stored, or information indicative of an address for the data required for fetching the requested data for the entry in the first cache) stores (when it is storing information indicative of an address for the data required for fetching the requested data) a (the) remaining bits (part) of, such as, and in an embodiment, one or more, and in an embodiment plural, LSBs (least significant bits) of, an (the) overall (memory) address for the data required for fetching the requested data that the entry in the first cache is for.

In an embodiment, the tag portions of entries in the first cache also store (in a further part of the tag portion) additional information relating to the location in memory of the data for the entry, such as, and in an embodiment an "offset" that can be, and is in an embodiment, used (in addition to the data in the second cache) when determining, and (in part) to determine, the address of the data in memory, e.g., and in an embodiment, relative to some "base" address (for the data in question).

Other arrangements would, of course, be possible.

The data that is required to fetch the data into the first cache that is sought from and stored in (the data portion of) the second cache can be any suitable and desired data that may be necessary to fetch data into the first cache. This data in an embodiment comprises data that can be, and in an embodiment is, used, at least in part (and in an embodiment in part), to determine a storage (memory) address to be used for the data that is to be fetched into the first cache, such as a "base" address for that data.

In an embodiment, the data that is required to fetch the data into the first cache that is sought from and stored in the second cache comprises a "descriptor" that describes one or more, and in an embodiment plural, parameters relating to how the data required for the data processing operation is stored in memory (and so can and will accordingly be used to determine how and where to fetch that data from memory). The descriptor may, for example, and in an embodiment, include one or more of, in an embodiment plural of, and in an embodiment all of: an indication of the size of the data buffer that stores the data in question, an indication of a base address for the data buffer that stores the data in question; an indication of the layout in memory of the data buffer that stores the data in question; and a stride or strides for the data buffer that stores the data in question. It may also indicate access permissions for the data.

Other arrangements would, of course, be possible.

The tag portion of an entry in the second cache in an embodiment stores information indicative of an address of the data that the entry in the second cache is for, such as, and in an embodiment, the relevant descriptor address. This tag portion in an embodiment stores the entire address in question.

In an embodiment, each entry (e.g. cache line) in the second cache also has an associated identifier for the entry, such as, and in an embodiment, an index for the entry. This identifier, e.g. index, in an embodiment then acts as, and is used as, the information that indicates an entry in the second cache for data required for fetching data into the first cache that is stored in the tag portion of an entry in the first cache.

The technology described herein relates in particular to the operation when a request for data for a data processing operation from the first (primary) cache finds that there is no entry for that data in the first (primary) cache (i.e. when there is a "miss" in the first cache).

The determination that there is no entry for the requested data (that there is a miss) in the first cache is in an embodiment done in response to an attempt to read the required data from the first cache.

Thus, for example, and in an embodiment, an attempt will be made to read the required data from the first cache, in an embodiment by performing a look-up in the first cache to determine if there is an entry for the required data in the first cache. This look-up may, and in an embodiment does, use an appropriate identifier which will then be compared with the corresponding information in the tag portions of entries in the first cache to determine whether there is an entry in the first cache for the requested data. (The lookup operation will be described in more detail below.)

Thus, in an embodiment, the method of the technology described herein comprises (and the data processing system is correspondingly configured to), when a data processing operation requires data from the first cache, requesting that data from the first cache (in an embodiment by performing a look up for the data in the first cache), and in response to that request (look up) determining whether there is an entry for the requested data in the first cache (or not).

When the request for data (the look up) to the first cache determines that there is other than an entry (that there is not an entry) in the first cache for the requested data (i.e. there is a "miss" in the first cache), then that will be, and is in an embodiment, handled in the manner of the technology described herein, as discussed above.

In addition, when it is determined that there is other than an entry (that there is not an entry) in the first cache for the requested data (i.e. there is a "miss" in the first cache), the data processing operation in question should be, and is in an embodiment, stalled, whilst the data is fetched into the first cache.

On the other hand, when it is determined that there is already an entry in the first cache for the required data, then depending upon the state of that entry (e.g. whether the data is already stored in the entry, or the entry is awaiting a pending fetch of the data), the data can be, and is in an embodiment, returned for the data processing operation to proceed, or the data processing operation can be, and is in an embodiment, stalled until the entry actually contains the required data.

In an embodiment, when a data processing operation is stalled whilst waiting for data to be fetched into an entry in the first cache, the data processing operation is added to a record of such stalled data processing operations, such that the data processing operation can then be re-tried (performed), e.g. at a later time, e.g., and in an embodiment, once the required data has been loaded into the first cache. The record should be, and is in an embodiment, such that a data processing operation can be recommenced after the data required for the data processing operation arrives in the first cache.

(When a data processing operation is recommenced once (when) the data required for the data processing operation has arrived in the first cache, the data processing operation in an embodiment again will request the required data from the first, primary cache (which will now be present in the first cache), and then use that data in the data processing operation. Alternatively, a data processing operation may perform a look-up in the first cache, and if it hits, take the identifier of the entry in the second cache, or if it misses wait until a new entry is allocated and take the identifier for the entry in the second cache (and in either case use the identifier of the entry in the second cache to trigger the obtaining of the relevant data from the second cache). Then when the data has arrived in the first cache (or if it's already there), the operation doesn't perform a look-up again, but instead just reads the data out of the first cache (since it should be guaranteed that the data is there). Other arrangements would, of course, be possible.)

When there is a "miss" in the first, primary cache, then (as well as stalling the data processing operation in question), an entry for the required data is allocated in the first cache. An entry for the required data can be allocated in the first cache in any suitable and desired manner, such as, and in an embodiment, in the normal manner for allocating cache entries in the data processing system in question. Thus, the entry allocation process may use, for example, and in an embodiment, any suitable and desired cache entry allocation policy, such as a least recently used (LRU) allocation policy. Other arrangements would, of course, be possible.

(If a line cannot be allocated at all in the first cache, that can be, and is in an embodiment, handled in the normal manner for such situations in the data processing system in question.)

Once an entry in the first cache has been allocated for the requested data, that entry is tagged, inter alia, with information that indicates an entry in the second cache where data required for fetching the requested data is stored.

The information that indicates an entry in the second cache where data required for fetching the requested data is stored can take any suitable and desired form. It should be information that identifies an entry in the second cache.

In the embodiment, where each entry in the second cache has a corresponding identifier, such as, and in an embodiment, an index, it is that identifier that is stored in the tag portion of the allocated entry in the first cache. Thus, in an embodiment, the information that indicates an entry in the second cache for data required for fetching the requested data, that is stored in the tag portion of the allocated entry in the first cache, comprises an identifier, and in an embodiment an index, for the entry in the second cache.

To facilitate this operation, the information, e.g. index, that indicates the entry in the second cache where the data required for fetching the requested data is stored is in an embodiment provided as part of the request for the data in the first cache (with the cache look-up), so that that information can be taken from the look-up request and stored in the tag portion of the allocated entry in the first cache as appropriate.

In this regard, and as will be discussed in more detail below, in an embodiment, a look-up in the second cache for the (entry for the) data that is required for fetching the requested data into the first cache is made in advance of the request for the data in the first, primary cache, such that there should be, and is in an embodiment, an entry in the second cache for the data required for fetching the requested data into the first cache by the time the request for the data to the first, primary cache is made. (It should be noted here that while there should be an entry in the second cache at this point, the data for that entry may not necessarily be available, so the data part of the entry may still be invalid in the second cache.)

(At least) in this case, the entry in the second cache for the data required for fetching the requested data into the first, primary cache will be known before the request for that data is made to the first cache, such that the identity of the entry in the second cache for the data required for fetching the requested data into the first cache will be known at the time the data is requested from the first cache (and can accordingly be provided as part of the first cache look-up process).

In an embodiment, once an entry (e.g. a cache line) has been allocated for the data in the first cache, the entry (cache line) is indicated as being in an "allocated" state, indicating that the entry has been allocated to receive data for a data processing operation and that that the data for that entry must be fetched from storage (e.g. main memory) (i.e. that data needs to be fetched for the entry but the fetch has not yet started). For such an "allocated" cache entry, the tag portion of the entry will be valid, but the data in the entry will not be valid. A subsequent "hit" on such an "allocated" cache entry accordingly means that the data processing operation that needs the data to be fetched in the cache entry should be stalled, but it is known that data for that operation will arrive into the cache entry at some point.

Once an entry in the first cache has been allocated for the requested data, then the requested data that is required for the data processing operation can be, and is in an embodiment, fetched into the entry in the first cache, so that it is then available for the data processing operation.

This fetching operation includes first reading the data that is required to fetch the data into the first cache from the second cache. The data that is required to fetch the data into the first cache read from the second cache is in an embodiment then used to fetch the data required for the data processing operation into the first cache. Thus after the data required for fetching the requested data has been read from the second cache, a read request is sent towards the memory system for the requested data, which read request will, inter alia, and in an embodiment, use some or all of the data required for fetching the requested data read from the second cache.

The look-up and reading from the second cache of the data required for fetching requested data into the first cache may be performed in any suitable and desired manner. In an embodiment it uses the information, e.g. index, that indicates the entry in the second cache for the data required for fetching the data into the first cache (which, as discussed above, is in an embodiment provided as part of the request for data to the first cache and will be stored in the tag portion of the entry in the first cache), to determine and identify the required entry in the second cache.

Thus, in an embodiment, the reading from the second cache of the data required for fetching the requested data comprises using the information, e.g. index, that indicates the entry in the second cache for the data required for fetching the requested data stored in the tag portion of the allocated entry in the first cache, to identify and access the entry in the second cache where that data should be read from (is stored).

In the case where the data required to fetch the data into the first cache is present in the second cache when the attempt is made to read that data from the second cache, then that data can simply be read from the second cache, and then used to fetch the data into the first cache.

On the other hand, if the data that is required to fetch the data into the first cache is not present in the second cache when an attempt to read that data from the second cache is made in response to a miss in the first cache, then in an embodiment the fetching process into the first cache, etc., is appropriately stalled until the required data is present in the second cache. Such a "miss" in the second cache can be handled in any suitable and appropriate manner, such as, and in an embodiment, in the normal manner for the data processing system in question.

After the data required for fetching the requested data into the first cache has been read from the second cache, an appropriate request for the required data for the data processing operation is sent towards the memory system (where that data will be stored) (the process of fetching the data required for the data processing operation into the first cache is performed).

The requesting (fetching) of the required data into the allocated entry in the first cache can be performed in any suitable and desired manner, such as, and in an embodiment, in accordance with the normal manner for fetching data into a cache of the data processing system in question.

The request for the required data for the data processing operation should include any and all information that is required for fetching the data. Thus it should, in particular, and in an embodiment, include an appropriate (memory) address for the requested data.

The address that is used in the (memory) request may be determined in any suitable and desired manner. The address determination should, and in an embodiment does, use at least (some of) the data required for fetching the requested data that has been returned from the second cache. It may also use data, such as address data, from the data request itself (and which is, e.g., and in an embodiment, part of the tag portion for the entry in the first and/or second cache).

Thus, in an embodiment, the data required for fetching the requested data that has been returned from the second cache is used, at least in part, to determine an address for the required data in memory, and then a request is sent to the memory to fetch data from that address.

It will be appreciated in this regard that the request for the required data for the data processing operation to fetch that data into the allocated entry in the first cache will be sent towards the memory system, and, if necessary, will fetch the requested data from main memory of the data processing system. However, in a data processing system where there are further caches intermediate the first cache and the relevant main memory of the data processing system, then the request for the required data for the data processing system may be serviced by (the data provided from) a cache that is already storing that data that is intermediate the first cache and the main memory (such that the request may not reach the main memory if it can be serviced from intermediate cache instead), as appropriate. In an embodiment, there are further caches intermediate the first cache and the relevant main memory of the data processing system In an embodiment, an entry in the first cache for which a request for data has been sent towards the memory system can be, and is in an embodiment, indicated as being in a "requested" state, i.e. in which the cache entry has been allocated and the data for the entry has been requested from storage (e.g. main memory) (i.e. that the fetch of data for the cache entry has started but has not yet completed). Again, in the case of a cache entry in such a "requested" state, the tag portion of the line will be valid, but not the data. Correspondingly a hit on a "requested" line will mean that the data processing operation should be stalled, but it is known that the data for the data processing operation will be arriving in the cache entry (soon) (as the data for the entry has already been requested).

In the technology described herein, once a request for the data for an allocated entry in the first cache has been sent towards the memory system (after the data required for fetching the requested data has been read from the second cache), the information in the tag portion for the allocated entry in the first cache indicating an entry in the second cache for the data required for fetching the requested data is replaced with information indicative of an address of the data required for fetching the requested data.

Thus, when an entry in the first cache changes from an "allocated" state to a "requested" state, the tag portion for the entry in the first cache is also changed.

(It should be noted in this regard that the tag portion is changed by replacing the information (e.g. index) that indicates an entry in the second cache with information indicative of an address, rather than the information indicative of an address simply being added to the tag portion in addition to the information that indicates an entry in the second cache. Thus the content of the tag portion for the entry in the first cache changes, and is different, depending upon the state of the entry in the first cache.)

The information indicative of an address for the data required for fetching the requested data that is stored in the tag portion of the entry in the first cache can comprise any suitable and desired information indicative of an address for the data required for fetching the requested data.

In an embodiment, the information indicative of an address of the data required for fetching the requested data that is used to replace the information that indicates an entry in the second cache in the tag portion of the entry in the first cache comprises, as discussed above, part of, and in an embodiment a remaining part of, such as, and in an embodiment a set of one or more LSBs of, an (the) overall address for the data required for fetching the requested data (and that, in an embodiment, is stored in the tag portion of the entry in the second cache for that data).

Correspondingly, in an embodiment, the information indicative of an address of the data required for fetching the requested data that is used to replace the information that indicates an entry in the second cache in the tag portion of the entry in the first cache comprises address information that has been obtained from the entry in the second cache where the data required for fetching the requested data from the second cache was read from, and in an embodiment address information from the tag portion of the entry in the second cache.

Thus, in an embodiment, once the data required for fetching the requested data into the first cache has been returned from the second cache, the information in the tag portion of the entry in the first cache that indicates an entry in the second cache for data required for fetching the requested data is replaced with information indicative of an address of the data required for fetching the requested data that has been obtained from the tag portion of the read entry in the second cache.

Correspondingly, in an embodiment, the information that indicates an entry in the second cache in the tag portion of the entry in the first cache is replaced with part of the address for the data required for fetching the requested data (in an embodiment from the tag portion of the entry in the second cache), such that the tag portion of the entry in the first cache then stores the entire (complete) address for the data required for fetching the requested data that was used as the tag for the entry for that data in the second cache.

As discussed above, in an embodiment, the method of the technology described herein comprises (and the data processing system is correspondingly configured to) performing in advance of a request for data for a data processing operation from the first cache, a look-up in the second cache to determine whether there is an entry in the second cache for data required for fetching the data (that will be requested) into the first cache.

This look-up into the second cache is in an embodiment performed sufficiently far in advance of the intended request for data for a data processing operation from the first cache, and/or the relevant request for data in the first cache is in an embodiment appropriately delayed (stalled), such that by the time the request for the data is made to the first cache, the required data for fetching the requested data is likely to be, and is in an embodiment, present (and valid) in the second cache.

This "in-advance" look-up in the second cache can be performed in any suitable and desired manner, and is in an embodiment done in the normal manner for such cache look-ups for the data processing system in question. Thus it in an embodiment uses an appropriate memory address indicative of the storage (memory) location where the data required for fetching the requested data for the data processing operation is stored to look-up into the second cache.

This in-advance look-up into the second cache for an entry for data that is required for fetching the required data into the first cache in an embodiment returns information, such as and in an embodiment, an identifier, and in an embodiment an index, indicating the entry in the second cache for the data required for fetching the requested data into the first cache.

Thus, for example, and in an embodiment, in the case where the in-advance look-up into the second cache determines that an entry for the data required for fetching the data into the first cache is already present in the second cache, that look-up will return the identity, e.g. index, of that entry in the second cache.

On the other hand, in the case where there is not already an entry in the second cache for the data required for fetching the data into the first cache when the in-advance look-up is performed, then in an embodiment an entry for the data required for fetching the data into the first cache is allocated in the second cache (and the data is then fetched into that entry in the second cache (such that it should then be present in the second cache by the time the request for the data to the first cache is made)).

In this case, the look-up in the second cache will return the identity, e.g. index, of the entry in the second cache that has been allocated for storing the data required for fetching the data in the first cache.

Where a cache entry needs to be allocated and data fetched into the second cache, that operation can proceed in any suitable and desired manner, such as, and in an embodiment, in the normal manner for the data processing system in question.

Thus, in an embodiment, the method of the technology described herein comprises (and the data processing system is correspondingly configured to):

in advance of making a request for data for a data processing operation in the first cache:
performing a look-up in the second cache to determine whether there is an entry in the second cache for data required for fetching the to be requested data into the first cache;
and returning in response to that look-up in the second cache information that indicates the entry in the second cache for the data required for fetching the data to be requested from the first cache into the first cache.

As discussed above, the returned information that indicates the entry in the second cache where data required for fetching the data into the first cache is stored is in an embodiment then provided as part of (with) the request for the data in the first cache, and is in an embodiment, where appropriate, stored in the tag portion of the entry in the first cache as the information that indicates an entry in the second cache for data required for fetching the requested data, when an entry is newly allocated for requested data in the first cache.

Once a request for the required data to be loaded into an entry in the first cache has been sent towards the memory system, then in response to that request, the requested data will be returned from the memory (or another cache intermediate the first cache and the memory). In all cases, once the requested data arrives at the first cache it is in an embodiment appropriately stored in the data portion of the entry in question in the first cache.

In an embodiment, once the fetched data arrives in the entry in the first cache, the state of that entry is changed to "valid" (indicating that the entry now contains valid data). Thus, in an embodiment, entries in the first and second caches can also be indicated as being in a "valid" state, meaning that the entry contains valid data.

Correspondingly, the data processing operation or operations that require the fetched data may then start using that data (and this is in an embodiment appropriately triggered, such that data processing operation(s) awaiting the fetching of the data into the entry in the first cache are recommenced once the required data has arrived at the first cache).

It should be noted here that when the state of an entry in the first cache is changed from requested to valid, there in an embodiment is not any change to the tag portion of the entry. Thus, in an embodiment, the tag portion of an entry in the first cache is the same (has the same content) as the tag portion when the entry is in the "requested" state, i.e. it, in particular, stores information indicative of an address for the data required for fetching the data into the entry into the first cache, rather than an identifier, such as an index, for an entry in the second cache for that data.

In an embodiment, cache entries in both the first and second caches can also be indicated as having, and being in, an "invalid" state, meaning that the entry is not in use and does not contain any valid data (or a valid tag).

Thus, in an embodiment, a (and each) entry of the first and second caches can be indicated as having one of four states: invalid (meaning that the entry is not in use and does not contain any valid data); allocated (meaning that the entry is allocated and the data for it must be fetched); requested (meaning that the entry is allocated and the data for the entry has been requested from storage (e.g. main memory)); and valid (meaning that the entry contains valid data).

It will be appreciated from the above, that in the technology described herein the tag portion of an entry in the first cache will be different depending upon the state of the cache entry. In particular, the tag portion will store different information when the entry is in an "allocated" state, to when the entry is in an "requested" or "valid" state.

The Applicants believe that having different content for the tag portion of a cache entry in dependence upon the state of the cache entry in this way may be new and advantageous in its right, and not just where the tag portion stores the particular types of information discussed above, or in the particular case where fetching data into one cache requires data from another cache. For example, this may be applicable in the case of memory translation from virtual addresses to physical addresses. In this case, a virtual address cache would need to translate the virtual address to a physical address to send a fetching request to physical memory, with that translation happening through an appropriate translation lookaside buffer (TLB). In this case, the virtual address cache would be the first cache and the TLB the second cache in the arrangements of the technology described herein, with MSBs of virtual addresses being used to do a look-up in the TLB, for example.

Thus, a further embodiment of the technology described herein comprises a method of operating a cache in a data processing system, which cache stores one or more, and in an embodiment a plurality of, entries, wherein each entry includes a data portion and a tag portion, the tag portion for storing information for the entry in the cache that acts as an identifier for the entry in the cache, and wherein each entry in the cache can be in one of a plurality of different entry states;

the method comprising:
storing different information in the tag portion of an entry in the cache, in dependence upon the state of the entry in the cache.

A further embodiment of the technology described herein comprises a cache system for a data processing system, comprising:
a cache that stores one or more, and in an embodiment a plurality of entries, wherein each entry includes a data portion and a tag portion, the tag portion for storing information for the entry in the cache that acts as an identifier for the entry in the cache, and wherein each entry in the cache can be in one of a plurality of different entry states; and
a cache controller configured to store different information in the tag portion of an entry in the cache, in dependence upon the state of the entry in the cache.

As will be appreciated by those skilled in the art, these embodiments of the technology described herein can, and in an embodiment do, contain any one or more or all of the features of the technology described herein described herein, as appropriate.

Thus, for example, and in an embodiment, the different states that a cache entry can be in in an embodiment comprise at least an allocated state and a requested state, and in an embodiment comprise an allocated state, a requested state, a valid state and an invalid state.

Correspondingly, and in an embodiment, different information is stored in the tag portion for at least two of the different states that a cache entry can be in, but may be, and in an embodiment is, the same for two or more of the states that a cache entry can be in. In an embodiment the information stored in the tag portion is the same for the requested and valid states, but different for the allocated state.

Similarly, storing different information in the tag portion of the cache in dependence upon the state of the cache entry in an embodiment comprises changing the information that is stored in the tag portion of an entry in the cache when the entry changes state, and in an embodiment when the entry changes from an allocated state to a requested state, and in an embodiment comprises replacing (overwriting) information that is stored in the tag portion of an entry in the cache when the entry changes state, and in an embodiment when the entry changes from an allocated state to a requested state.

It will correspondingly be appreciated that as a result of the operation in the manner of the technology described herein, an entry in the first cache may and in an embodiment does have a different form of tag portion in dependence upon the state of the entry. In particular, in the embodiments of the technology described herein at least, the tag portion for an entry in the "allocated" state will be different to the tag portion for that same entry when the entry is in the requested or valid state.

Accordingly, in an embodiment, the operation of performing a look-up for data (and for an entry) in the first cache is correspondingly performed and configured to allow for this.

A look-up for data (and for an entry) in the first cache should, and in an embodiment does, use an appropriate identifier that will then be compared to the tag portions of entries in the first cache to see if there is a (sufficient) match between the identifier being used for the look-up and the tag portion of an entry in the cache. In an embodiment, this look-up operation is performed and configured in such a manner so as to allow for the fact that an entry in the first cache may have different forms of tag portion, in dependence upon the state of the entry.

This may be achieved in any suitable and desired manner.

For example, a look-up for data and an entry in the first cache could simply use all the different forms that the tag portion of an entry in the first cache could have to perform the look-up, to see if there is a match (a "hit") for any of the possible forms of the tag portion (and in one embodiment, this is what is done). This would then be able to identify whether there was a "hit" for any form of the tag portion for an entry for the data that is being requested.

Thus, for example, and in one embodiment, a look-up for data and an entry in the first cache would in this case be performed using plural different identifiers for comparison with the tag portions of entries in the first cache, and in particular be performed using two or more different identifiers for comparison with the tag portions of entries in the first cache. Thus, in this case, a look-up would comprise comparing the tag portion of an entry in the first cache with both a first identifier, and a second, different identifier (and potentially with further different identifiers, if and as appropriate), to determine if there is a match between the tag portion of the entry in the cache and any of the different identifiers that are being used for the look-up.

Thus, for example, in the case of the embodiments of the technology described herein at least, a look-up in this case would be performed using two identifiers for the look-up: a first identifier that uses information that indicates an entry in the second cache (for data required for fetching the requested data); and a second, different identifier, that uses (includes) information indicative of an address for the data required for fetching the requested data (instead of the information that indicates an entry in the second cache).

Thus in one embodiment, the look-up in the first, primary cache will compare the tag portion of each cache line in the primary cache with two different identifiers, one corresponding to an index in the second cache, and one comprising a memory address for data that is stored in the second cache (for the data required for fetching the requested data that the look-up relates to).

These arrangements would require the tag portion of each entry in the first cache (when a look-up in the first cache is being performed) to be compared against plural (e.g. two) different identifiers to see if there is a (sufficient) match.

This being the case, in an embodiment, the identifier that is used for the look-up and that is compared to the tag portion of an entry in the first cache is changed based on the state of the entry in the first cache that is being considered (tested). In particular, and in an embodiment, when performing a look-up in the first cache, for an entry in the first cache that is to be tested for the look-up, the state of the entry is in an embodiment first determined, and then the identifier to be used for testing against the tag portion of the entry selected based on the state of the entry (and then compared to the tag portion of the entry to see if there is a (sufficient) match or not).

Thus, for example, and in an embodiment, when it is determined that the entry is in a first state, such as, and in an embodiment, an allocated state, the identifier used for the look-up is set to be a first form of identifier such as, and in an embodiment, an identifier (and in an embodiment an index) for an entry in the second cache, and when the cache entry is in a different state to the first state, such as, and in an embodiment, in a requested or valid state, using a different identifier for comparison with the tag portion of the entry, such as, and in an embodiment, information indicative of an address for data that is stored in the second cache (that is required for fetching the requested data).

Correspondingly, in an embodiment, the look-up in the first cache to determine if there is an entry for the requested data in the first cache in an embodiment uses information that indicates an entry in the second cache in the case that the entry in the first cache being considered is in a first state (and in an embodiment the allocated state), and in an embodiment uses information indicative of an address for the data required for fetching the requested data (and in an embodiment the address for data that is stored in the second cache (that is required for fetching the requested data)) when the entry in the first cache is in a state different to the first state, such as and in an embodiment in a requested or valid state.

It will be appreciated in this regard that the look-up in the first cache to see if there is an entry for data required for a data processing operation may, and in an embodiment does, accordingly use a different identifier for comparing to the tag portion for different entries in the first cache (where the entries in the first cache are in different states). Thus where the entries in the first cache are in different states, different entries will be tested with different identifiers when performing a look-up for data in the first cache.

As discussed above, in the embodiments of the technology described herein at least, the request for data that is made to the first cache will include with it and provide both information indicative of an address for the data required for fetching the requested data (and in an embodiment the address for the data required for fetching the requested data), and information, such as and in an embodiment an index, that indicates the entry in the second cache for the data required for fetching the requested data. Thus both the information that indicates an entry in the second cache, and the information indicative of an address for the data required for fetching the requested data will be provided and available when the look-up for the required data in the first cache is performed (and so can be used for that look-up).

It is believed that such arrangements where a look-up in a cache uses different forms of identifier for the look-up in dependence upon the state of a cache entry may be new and advantageous in their own right, and not solely in the context of the particular operation in the manner of the other embodiments of the technology described herein.

Thus, another embodiment of the technology described herein comprises a method of operating a cache in a data processing system, which cache stores one or more, and in an embodiment a plurality of, entries, wherein each entry includes a data portion and a tag portion, the tag portion for storing information for the entry in the cache that acts as an identifier for the entry in the cache, and wherein each entry in the cache can be in one of a plurality of different entry states;

the method comprising, when performing a look-up for data in the cache, the look-up using an identifier that will be compared to the tag portions of entries in the cache to see if there is a match between the identifier being used for the look-up and the tag portion of an entry in the cache:

for an (and in an embodiment for plural, and in an embodiment for each) entry in the cache being tested for the look-up:

determining the state of the cache entry;

selecting the identifier to use for testing against the tag portion of the entry based on the determined state of the entry; and comparing the selected identifier to the tag portion of the entry to see if there is a match or not.

A further embodiment of the technology described herein comprises a cache system for a data processing system, comprising:

a cache that stores one or more, and in an embodiment a plurality of, entries, wherein each entry includes a data portion and a tag portion, the tag portion for storing information for the entry in the cache that acts as an identifier for the entry in the cache, and wherein each entry in the cache can be in one of a plurality of different entry states; and a cache controller configured to when performing a look-up for data in the cache, the look-up using an identifier that will be compared to the tag portions of entries in the cache to see if there is a match between the identifier being used for the look-up and the tag portion of an entry in the cache:

for an entry in the cache being tested for the look-up:

determine the state of the cache entry being tested;

select an identifier to use for testing against the tag portion of the entry based on the determined state of the entry; and compare the selected identifier to the tag portion of the entry to see if there is a match or not.

As will be appreciated by those skilled in the art, these embodiments of the technology described herein can, and in an embodiment do, contain any one or more or all of the features of the technology described herein described herein, as appropriate.

Thus, for example, and in an embodiment, the different states that a cache entry can be in in an embodiment comprise at least an allocated state and a requested state, and in an embodiment comprise an allocated state, a requested state, a valid state and an invalid state.

Correspondingly, different information is in an embodiment stored in the tag portion of an entry in the cache, in dependence upon the state of the entry in the cache, and in an embodiment different information is stored in the tag portion for at least two of the different states that a cache entry can be in, but may be, and in an embodiment is, the same for two or more of the states that a cache entry can be in. In an embodiment the information stored in the tag portion is the same for the requested and valid states, but different for the allocated state.

Similarly, in an embodiment, when it is determined that the entry is in a first state, such as, and in an embodiment, in an allocated state, the identifier selected to use for the look-up is in an embodiment a first form of identifier such as, and in an embodiment, an identifier (and in an embodiment an index) for an entry in another cache, and when the cache entry is in a different state to the first state, such as, and in an embodiment, in a requested or valid state, a different identifier is selected and used for comparison with the tag portion of the entry, such as, and in an embodiment, an identifier comprising information indicative of an address for data in memory, and in an embodiment an address for data that is stored in the another cache (and in an embodiment an address for data that is required for fetching the requested data into the cache).

Although the technology described herein has been described above primarily with reference to a given data processing operation, the operation in the manner of the technology described herein can be, and is in an embodiment, performed in respect of plural data processing operations, e.g., and in an embodiment, in respect of each data processing operation that requires data from the first cache.

The operation of looking up and, if necessary, fetching of data into the first, primary, and second caches in the manner of the technology described herein can be implemented in any suitable and desired manner. Thus, there may, for example, be, and is in an embodiment, an appropriate communication path or paths between the first, primary cache, and the second cache, and corresponding processing logic, provided for this purpose.

Correspondingly, the at least one processing circuit that controls and perform the cache operations in the manner of the technology described herein may comprise any suitable and desired processing circuit or circuits for that purpose. This operation may be performed by a single, e.g. centralised, processing circuit or by a combination of different (e.g. distributed) processing circuits. For example, there may be one or more cache controllers (cache control circuits) that together perform this operation, and/or other circuits, such as fetch circuits, etc., that perform different aspects of this operation Subject to the specific arrangements and embodiments of the technology described herein described above, the looking up of data in the caches and the fetching of data into the caches, e.g. from main memory, can otherwise be performed in any suitable and desired manner, such as, and in an embodiment, in the normal manner for cache look-ups and data fetches in the data processing system in question.

The technology described herein can be used in any data processing system where the handling of cache misses may be dependent upon data stored in another cache. As discussed above, the Applicants have recognised that such situations can in particular arise in graphics processing systems. Thus, in an embodiment, the data processing system is a graphics processing system, and, correspondingly, the data processing operation is a graphics processing operation.

As discussed above, the Applicants have recognised that in the case of graphics processing systems, a particular example of cache operation that may be dependent upon data stored in another cache is in graphics texturing operations. Thus, in an embodiment, the data processing operation is a graphics texturing operation.

In this case, the data that is stored in the first, primary cache, is in an embodiment texture data (in an embodiment texture sample (texel) data), and the data that is stored in the second cache is in an embodiment (texture) plane data, and in an embodiment a (texture) plane descriptor, that is used for accesses to textures in memory. The texture plane descriptor may, for example, and in an embodiment, define aspects and features of the data buffer where the texture plane in question is stored, such as defining a base address for the data buffer where the texture plane is stored, and the layout of the texture data, such as a stride or strides for the data, that is stored in that buffer. Other arrangements would, of course, be possible.

The technology described herein can be used for all forms of output that a graphics processing system may be used to generate, such as frames for display, render to texture outputs, etc. The output, e.g. fragment shaded, data values from the graphics processing are in an embodiment exported to external, e.g. main, memory, for storage and use, such as to a frame buffer for a display.

The technology described herein is applicable to any suitable form or configuration of graphics processor and graphics processing systems. In one embodiment, the graphics processor and graphics processing system is a tile-based processor/system.

Another example of cache operation where the technology described herein may be particularly useful is in the context of a memory management unit (MMU), for example where, the first, primary cache stores fully resolved page table entries such that a memory mapping translation can be completed with only a single lookup on a hit in that first, primary cache, but on a miss in that first, primary cache, multiple dependent lookups in another cache (or series of caches), would be required to perform multiple levels of page table walks.

It may also be applicable in the case of memory translation from virtual addresses to physical addresses. In this case, a virtual address cache would need to translate a virtual address to a physical address to send a fetching request to physical memory, with that translation happening through an appropriate translation lookaside buffer (TLB). In this case, the virtual address cache would be the first cache and the TLB the second cache in the arrangements of the technology described herein with MSBs of virtual addresses being used to do a look-up in the TLB, for example.

In an embodiment, the data, e.g. graphics, processing system comprises, and/or is in communication with, one or more memories and/or memory devices that store the data described herein, and/or that store software for performing the processes described herein. The data, e.g. graphics, processing system may also be in communication with a host microprocessor, and/or with a display for displaying images based on the output of the data, e.g. graphics, processing system.

The technology described herein can be implemented in any suitable data processing system that uses caches, such as a suitably configured micro-processor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuits/circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. Thus, further embodiments of the technology described herein comprise computer software specifically adapted to carry out the methods herein described when installed on a data processor(s), a computer program element comprising computer software code portions for performing the methods herein described when the program element is run on one or more data processors, and a computer program comprising program code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a data, e.g. graphics, processor, or other system comprising one or more data processors causes in conjunction with said data processor(s) said processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described. As discussed above, the technology described herein, and thus the present embodiments, relate in particular to cache operations in data processing systems where the fetching of data into a first cache uses, and is dependent upon, data stored in a second cache.

FIG. 1 shows an exemplary data processing system having such a cache arrangement, and which is operated in accordance with and in the manner of the technology described herein.

As shown in FIG. 1, in this embodiment, the data processing system 1, comprises, inter alia, a processing pipeline 211 comprising plural processing stages S0 211A, S1 211B, S2 211C, and S3 211D, which will each respectively perform data processing operations in a pipelined fashion.

In the embodiment shown in FIG. 1, it is assumed that at least the final data processing stage S3 211D of the processing pipeline 211 will use data from memory 208 for its data processing, which data is, as shown in FIG. 1, loaded from the memory into a "data" cache DATAC 204 and retrieved from that cache 204 for use by the processing stage S3 211D.

The data cache 204 accordingly corresponds to the first, primary cache discussed in relation to the technology described herein above.

As shown in FIG. 1, in this embodiment, in order to be able to fetch data from the memory 208 into the data cache 204, an appropriate "descriptor" that includes data necessary for fetching the data from the memory 208 into the data cache 204 is required. These descriptors are stored in a respective descriptor cache DESCC 206, from where they are retrieved when data needs to be fetched into the data cache 204.

Again, as shown in FIG. 1, the descriptors are loaded into the descriptor cache 206 from the memory 208. The descriptor cache 206 in this embodiment therefore corresponds to the second (secondary) cache discussed above in relation to the operation in the manner of the technology described herein.

As shown in FIG. 1, the data cache 204 and descriptor cache 206 each have an associated cache controller (circuit or circuits) 218, 219, respectively.

Figure 2:
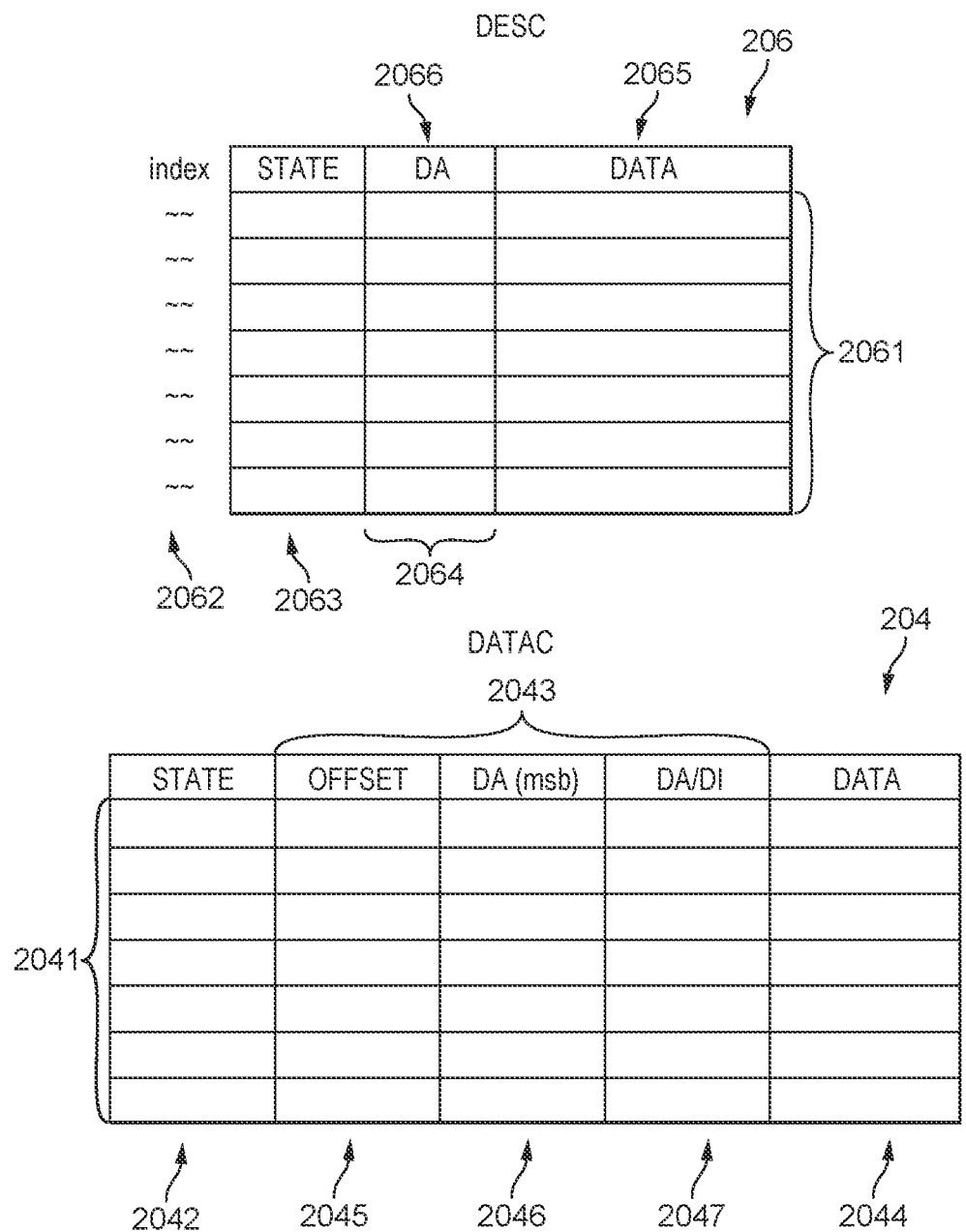
FIG. 2 shows the cache layout in an embodiment of the technology described herein.

FIG. 2 shows the layout of the descriptor cache 206 and of the data cache 204 in more detail.

As shown in FIG. 2, the descriptor cache 206 comprises a plurality of entries (cache lines) 2061, and each entry has stored for it a state 2063, a tag portion 2064, and a data portion 2065. Each entry also has an associated index 2062 that identifies the entry in the descriptor cache.

The data cache 204 correspondingly comprises a plurality of entries (cache lines) 2041, with each entry having an associated state 2042, a tag portion 2043, and a data portion 2044.

The state entries for the cache lines in the data cache 204 and the descriptor cache 206 are used to indicate the current "state" of the cache line (cache entry) in question.

Figure 3:
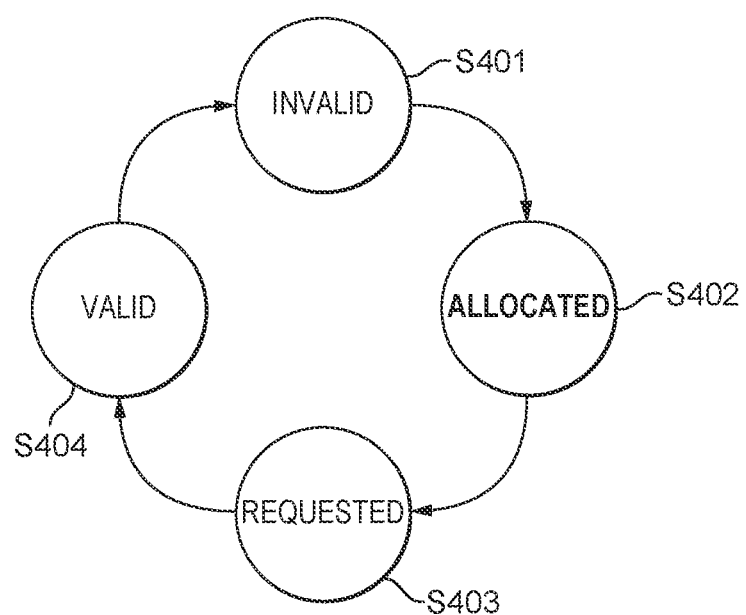
FIG. 3 shows possible cache states in an embodiment of the technology described herein.

In the present embodiments, as shown in FIG. 3, an entry (cache line) in the descriptor cache 206 and in the data cache 204 can be in one of four states, an invalid state 401, in which the cache entry is invalid, an allocated state 402 in which the cache entry has been allocated to store data but the data has yet to be requested from the memory, a requested state 403 where data has been requested for the cache entry but has not yet arrived in the cache entry, and a valid state 404 where data has been fetched into the cache entry and so the entry contains valid data. As shown in FIG. 3, a given cache entry is able to move between these states in the sequence: invalid to allocated to requested to valid to invalid (and so on).

The index for the entries in the descriptor cache 206 is a numerical index that (uniquely) identifies the entry (the cache line) in the descriptor cache.

The tag portion 2064 in the descriptor cache stores, in the present embodiments, a "descriptor address", DA, 2066 corresponding to and indicating the memory address where the descriptor that is stored in the data portion of the cache line in question is stored in the memory.

The data portion 2065 of an entry in the descriptor cache 206 stores the corresponding descriptor that contains information that will be used to load data that the descriptor is for from the memory into the data cache 204. The descriptor may contain any suitable and desired information that is required for loading data into the data cache, such as information describing the address (e.g. a base address) of the corresponding data buffer in the memory, and the layout of the data in the data buffer (which may then be used to locate particular data items in the overall data buffer).

The tag portions 2043 of the entries in the data cache 204 store, in the present embodiments and as shown in FIG. 2, three pieces of information: an "offset" 2045 that is to be used when determining the location of the corresponding data in memory and represents an appropriate offset for that data from, for example, a base address from which the data's actual address is to be determined; a set 2046 of the most significant bits, DA (rest), of the address of the descriptor for the data that the cache entry relates to (and thus corresponds to a set of the most significant bits of the tag portion 2064 of the entry in the descriptor cache 206 for that descriptor), and a final part, DA/DI, 2047 which alternatively stores either the remaining least significant bits of the corresponding descriptor address, DA, or the index, DI, of the entry in the descriptor cache 206 for the descriptor for the data that the entry in the data cache 204 relates to, in dependence upon the state of the entry in the data cache (and in the manner of, and in accordance with, the technology described herein (this will be discussed in more detail below)).

In the present embodiment, as shown in FIG. 1, it is assumed that the request for the data to be used by the pipeline stage 211D will use an address, DA, for the corresponding descriptor that stores the information required to fetch the data into the data cache 204, as an identifier in the request for the data that is made to the data cache 204.

In the present embodiments, in order to facilitate the loading of the required data into the data cache 204 when the request for that data is made to the data cache 204, a look-up to determine if the corresponding descriptor (identified by the descriptor address DA) is present in the descriptor cache 206 is made in advance of the request for the data to the data cache 204.

As shown in FIG. 1, this look-up into the descriptor cache 206 to see if there is an entry for the required descriptor in the descriptor cache 206 is performed in advance of the processing that will require the data in the data cache, so as to try to ensure that there will be an entry for the required descriptor in the descriptor cache 206 when the data is requested from the data cache 204.

Thus, as shown in FIG. 1, a look-up 212, that uses the descriptor address DA as an identifier, is made in the descriptor cache 206 after the first pipeline processing stage 211A has completed its processing (and accordingly in advance of the pipelined processing sequence reaching the fourth processing stage 211D that will need the data from the data cache 204).

In response to this look-up 212 in the descriptor cache 206, it will be determined whether there is already an entry in the descriptor cache 206 for the descriptor in question (as identified by the descriptor address DA). If there is already an entry in the descriptor cache for the required descriptor, then the look-up returns 213, as shown in FIG. 1, the corresponding index DI of the entry in the descriptor cache 206 for the descriptor in question.

On the other hand, if there is not already an entry in the descriptor cache 206 for the required descriptor, then a cache entry (cache line) in the descriptor cache 206 will be allocated for that descriptor, and a corresponding request 214 for the descriptor will be sent to the memory 208, with the descriptor then being loaded 215 into the allocated descriptor cache entry in the descriptor cache 206 accordingly. Again, the index DI of the allocated entry for the descriptor in the descriptor cache is returned 213 in response to the look-up 212 in the descriptor cache.

Thus, once the look-up 212 into the descriptor cache 206 has been made, an index DI for the entry in the descriptor cache where the relevant descriptor will be stored is returned to the processing pipeline.

Figure 4:
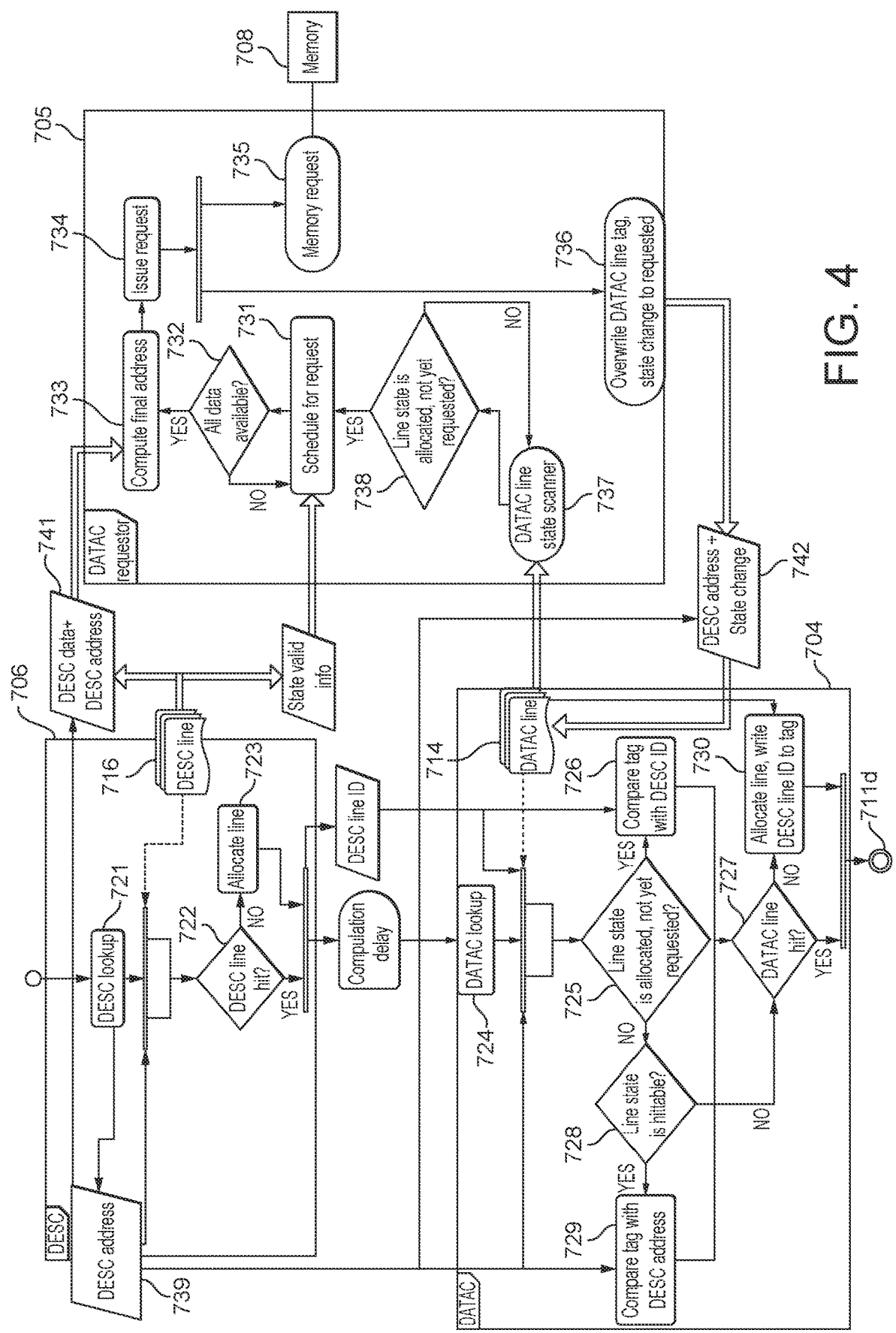
FIG. 4 shows the cache operation in an embodiment of the technology described herein.

FIG. 4 shows the operation of the look-up 706 in the descriptor cache 206 in more detail.

As shown in FIG. 4, when a look-up 721 is made into the descriptor cache, that uses the descriptor address 739, and it is determined whether there is a hit in the descriptor cache (step 722). The look-up will consider each entry in the descriptor cache 206 and determine whether there is an entry in the descriptor cache 206 for the descriptor in question.

If there is a hit in the descriptor cache 722, then the descriptor line ID 740 is returned. If there is not a hit in the descriptor cache in response to the look-up, then a line is allocated in the descriptor cache for the required descriptor (step 723), and the relevant descriptor will be fetched into the descriptor cache (not shown). Again the allocated descriptor line ID 740 is returned.

Once the look-up 212 into the descriptor cache 206 has been made, then the processing will continue through the second and third pipeline stages 211B and 211C.

The fourth pipeline stage 211D will then perform its processing, and, as discussed above, as part of that, in the present embodiment, request data required for that processing from the data cache 204.

The requesting of data from the data cache 204 is shown in more detail in FIG. 4.

As shown in FIG. 4, the request 704 for data from the data cache 204 performs a look-up into the data cache (step 724). The look-up in the data cache 204 will consider each entry in the data cache 204 to determine whether there is an entry in the data cache for the data that is required by the processing stage 211D for the processing operation it is to perform.

For this look-up in the data cache 204, the state of the entry (cache line) being considered is determined (step 725).

If the entry being considered is determined to be in the "allocated" state (as discussed above with reference to FIG. 3), then the appropriate part of the tag portion of the entry is compared with the descriptor entry index 740 that was returned from the look-up 212 into the descriptor cache step (726).

On the other hand, when it is determined at step 725 that the entry in the data cache 204 being considered is not in the allocated state, it is then determined whether the entry being considered is "hittable" or not (i.e. is in either the requested or valid state) (step 728). If so, the look-up then compares the relevant parts of the tag for the entry in the data cache 204 being considered with the address 739 for the corresponding descriptor that is needed to fetch the data for the entry into the data cache (step 729).

As shown in FIG. 4, in the case where there is a hit in the data cache (as determined at step 727), i.e. indicating that there is an allocated, requested or valid entry in the data cache for the data that is required, then the look-up in the data cache is complete.

In this case, if the cache entry that was "hit" is valid, then the data can simply be read from that valid entry. On the other hand, if the "hit" entry in the cache is in either the allocated or requested states, then that means that the actual valid data is not yet stored in the entry in question, so the data processing operation will be stalled until the required data has been loaded into the cache entry. In this case, the stalled data processing operation is in an embodiment added to a list of stalled data processing operations, to then be retried when and once the required data has been loaded into the entry in the data cache.

In the case where there was not a "hit" in the data cache in response to the data cache look-up (i.e. meaning that there is not already an entry for the required data in the data cache), then as shown in FIG. 4, an entry in the data cache is allocated for storing the required data (step 730). (The entry can be allocated in accordance with any suitable and desired cache entry allocation process, such as using a least recently used (LRU) allocation process or otherwise.)

In this case, as shown in FIG. 4, the index 740 for the corresponding entry in the descriptor cache 206 for the descriptor storing the data required for fetching the data into the data cache 204 is written into the relevant part of the tag for the allocated entry in the data cache (step 730). At this point, an entry has accordingly been allocated for the requested data in the data cache, but that data has not yet been requested from the memory (and is not yet present in the entry in the data cache).

In the case where an entry in the data cache is newly allocated for storing data required for a data processing operation, then the required data will accordingly need to be fetched from the memory system (or another cache closer to the memory system) and stored in the allocated entry in the data cache 204 before it can be used for the data processing operation.

In the present embodiments, the fetching of data into entries in the data cache 204 is performed by scanning the entries in the data cache 204, e.g. in a round robin fashion, to identify those entries in an "allocated" state (thereby indicating that they require the fetching of data from the memory 208). When an entry in the data cache 204 in the "allocated" state is identified, then the relevant descriptor is, as shown in FIG. 1, fetched 216 from the descriptor cache 206 using the index DI of the entry in the descriptor cache 206 for the descriptor in question, with that fetching process returning both the descriptor data from the identified entry, and also the full descriptor address DA from the tag portion of the identified entry.

The descriptor data is then used to determine the memory address where the required data is stored, and a request 218 for that data is accordingly sent to the memory 208.

At this point, the state of the entry in the data cache is changed to "requested", and the descriptor cache entry index stored in the tag portion of the allocated entry in the data cache 204 for the data in question is replaced with the remaining LSBs of the address DA for the descriptor returned from descriptor cache 206 (such that the tag portion of the entry in the data cache 204 will now store the full descriptor address DA, and no longer store the index of the entry in the descriptor cache for that descriptor).

Once the data has been returned 219 from the memory 208, it is stored in the corresponding entry in the data cache 204 and the state of the entry in the data cache is changed to valid, indicating that it contains valid data that can be used.

FIG. 4 shows the requesting 705 of data for allocated lines in the data cache 204 in the present embodiment in more detail.

As shown in FIG. 4, an appropriate scanning process will scan the entries 714 in the data cache 204 (step 737) to identify entries in the data cache 204 that are in the "allocated" (and not yet requested) state (step 738).

When an entry in the allocated state is identified, that entry is scheduled for requesting the required data from the memory (step 731). The request from memory is stalled until all the required data for making the request is available (e.g., and in an embodiment, until there is a valid descriptor in the entry in the descriptor cache indicated by the descriptor index (step 732)).

Once all the data for making the memory request is available, then the final address in the memory for the required data is determined (step 733), using the descriptor data obtained from the descriptor cache 206 (which is done using the (known) index DI of the entry in the descriptor cache where the relevant descriptor is stored).

A request for the data is then sent towards the memory 708 (steps 734 and 735).

In addition to sending the request for the data to the memory 708, as discussed above, and as shown in FIG. 4, the state of the entry in question in the data cache 204 is changed to "requested", and the descriptor cache entry index stored in the tag portion of the entry in the data cache 204 is overwritten (replaced) with the (remaining part of the) descriptor address DA that was not already stored in the tag portion of the entry in the data cache (such that the tag portion of the entry in the data cache then stores the full descriptor address DA) (steps 736 and 742).

Although not shown in FIG. 4, once the memory request has been made, the data will be returned from the memory 208 (or another cache) to the data cache 204 in response to the request, and stored in the entry in question in the data cache 204. At that point the state of the entry in the data cache 204 will be changed to "valid", indicating that it contains valid data (however, the tag portion for the entry in the data cache 204 will not be changed).

The data can then be read from the entry in the data cache 204 and used for the data processing operation, as appropriate. For example, the relevant data cache look-ups could be periodically repeated for stalled data processing operations, and/or it could be signalled when an entry in the data cache becomes "valid" (i.e. now stores valid data), with any stalled data processing operations that require the entry in the data cache that is now valid, then being identified and retried, and/or the stalled operations could "sniff" the data responses and thereby know when an entry becomes valid. Other arrangements would, of course, be possible.

It will be appreciated from the above that in the present embodiments, when a cache miss occurs in the data cache 204, an entry in that cache is allocated for the required data, and that cache entry moves to the allocated state and has the corresponding descriptor cache entry index in its tag portion. Once the corresponding descriptor has been read from the descriptor cache, and a request for the required data sent to the memory, the allocated entry in the data cache moves to the requested state, and at that stage, the descriptor index in its tag portion is replaced with the remaining part of the descriptor address for the corresponding descriptor.

Then, once the requested data is returned from the memory and stored in the cache entry, the cache entry moves into the valid state (but the tag portion remains unchanged).

FIGS. 5A-5D show an example of this changing of the state of an entry in the data cache and the corresponding changes in the tag portion of the data cache as a data cache entry moves to an allocated state and then to a requested and then a valid state.

FIGS. 5A-5D show exemplary content of both the descriptor cache 206 and the data cache 204. For simplicity, FIGS. 5A-5D simply show the state entries and tag portions of the respective entries in the descriptor cache and data cache, they do not also show the data portions of the entries.

Figure 5A:
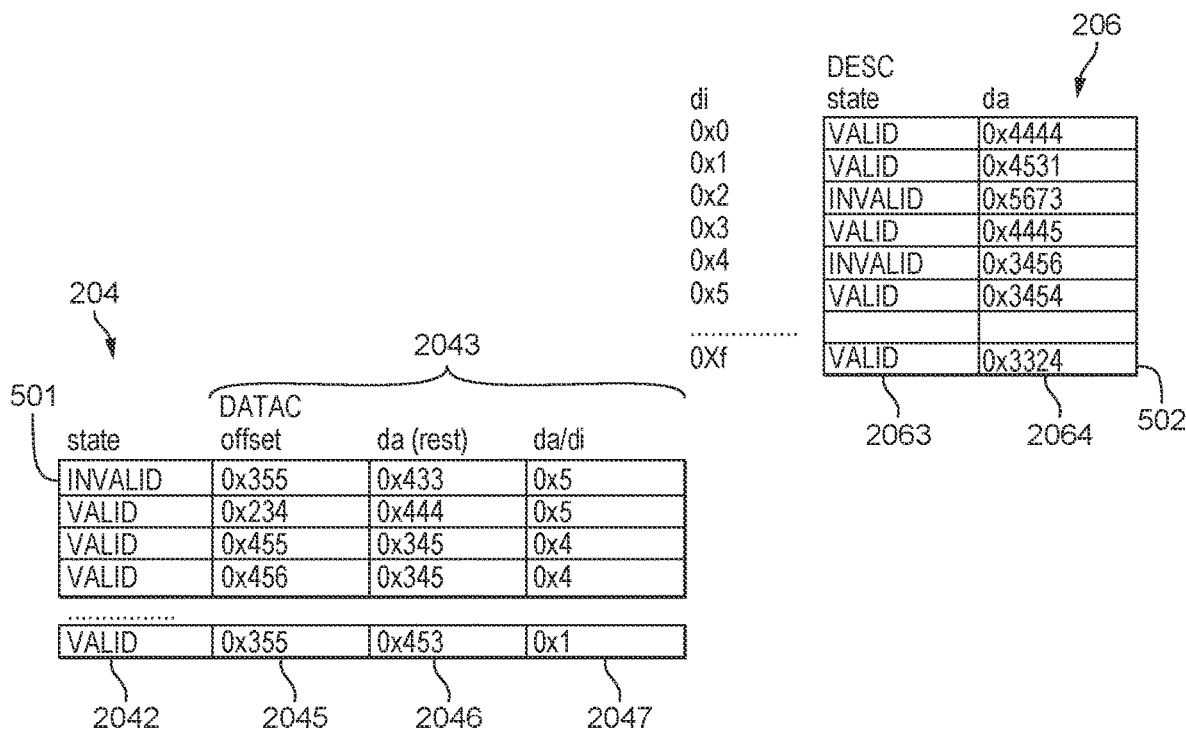

As shown in FIG. 5A, it is assumed that the descriptor cache 206 contains a number of entries, some of which are valid and some of which are invalid. As shown in FIG. 5A, each entry in the descriptor cache 206 is tagged 2064 with a corresponding descriptor address DA. Each entry also has a corresponding index DI 2062, identifying the entry in the descriptor cache.

Correspondingly, the data cache 204 is assumed to contain a number of entries, which are either in the invalid or valid states, with each entry storing at this point the full descriptor address (from the descriptor cache tag) for the entry in question (since all the data cache entries are either valid or invalid at this point).

Figure 5B:
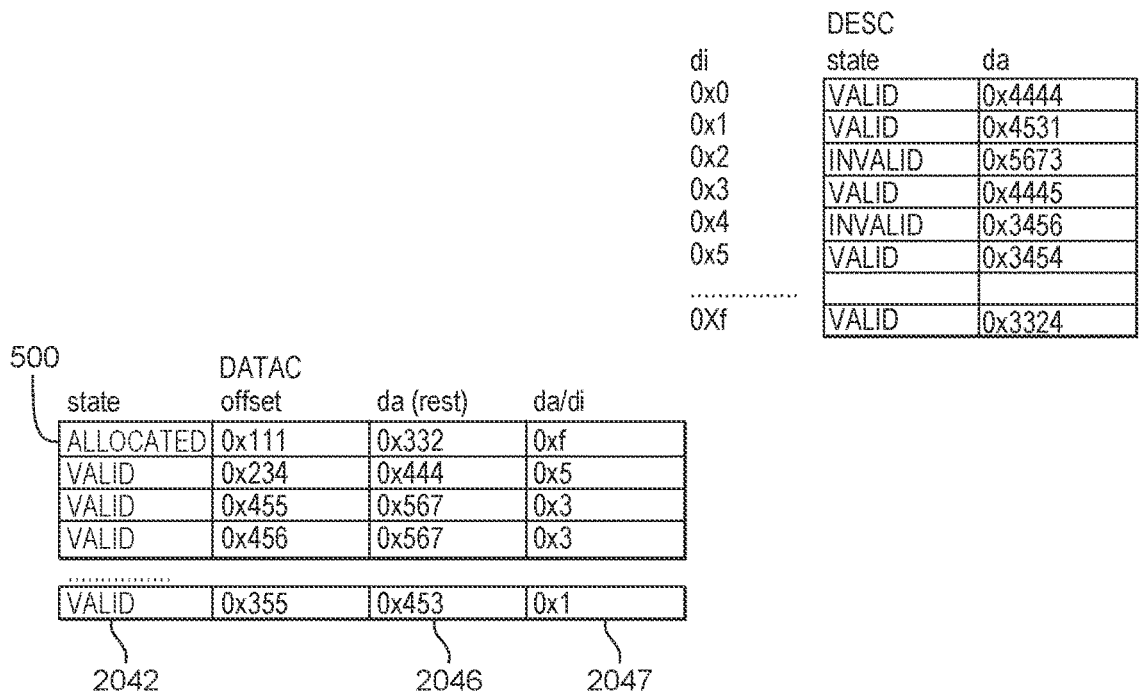

In FIG. 5B, it is assumed that an entry for new data is required in the data cache 204. Thus an appropriate entry 500 in the data cache 204 is allocated for storing the required data. In this example, it is assumed that the currently invalid entry 501 in the data cache 204 is selected for this purpose, and so that entry is now moved into the allocated state (as shown in FIG. 5B).

It is also assumed in this regard that the corresponding descriptor for the required data that will be loaded into the allocated entry in the data cache 204 is stored in the entry 502 having the index 0xf in the descriptor cache 206. Thus, as shown in FIG. 5B, the tag portion 2043 of the newly allocated entry 500 in the data cache 204 is written to include in its DA (rest) part the most significant bits of the descriptor address DA for the descriptor cache entry 0xf, and in its remaining alternate part 2047, the index 0xf of the corresponding entry 502 in the descriptor cache 206.

FIG. 5C then shows the content of the data cache 204 when the corresponding descriptor has been read and a request for the required data has been sent to the memory.

Thus, as shown in FIG. 5C, the state 2042 of the allocated entry 500 in the data cache 204 is changed to "requested" (as the request for the required data has now been sent to the memory), and the part 2047 of the tag portion storing the index 0xf of the corresponding entry 502 in the descriptor cache 206 has been overwritten with the remaining least significant bits of the descriptor address (from the tag portion of the entry 502 in the descriptor cache 206). Thus, at this stage, the "requested" entry in the data cache 206 now stores the full descriptor address, DA, for the corresponding descriptor (rather than any index for an entry in the descriptor cache).

FIG. 5D then shows the state of the data cache 204 once the requested data has been returned from the memory. Thus the state of the entry 500 in the data cache is now "valid" (and the tag portion remains the same as it was when in the "requested" state).

As discussed above, it is believed that the technology described herein will have particular application in graphics processing, and in particular in relation to texture mapping when performing graphics processing.

Figure 6:
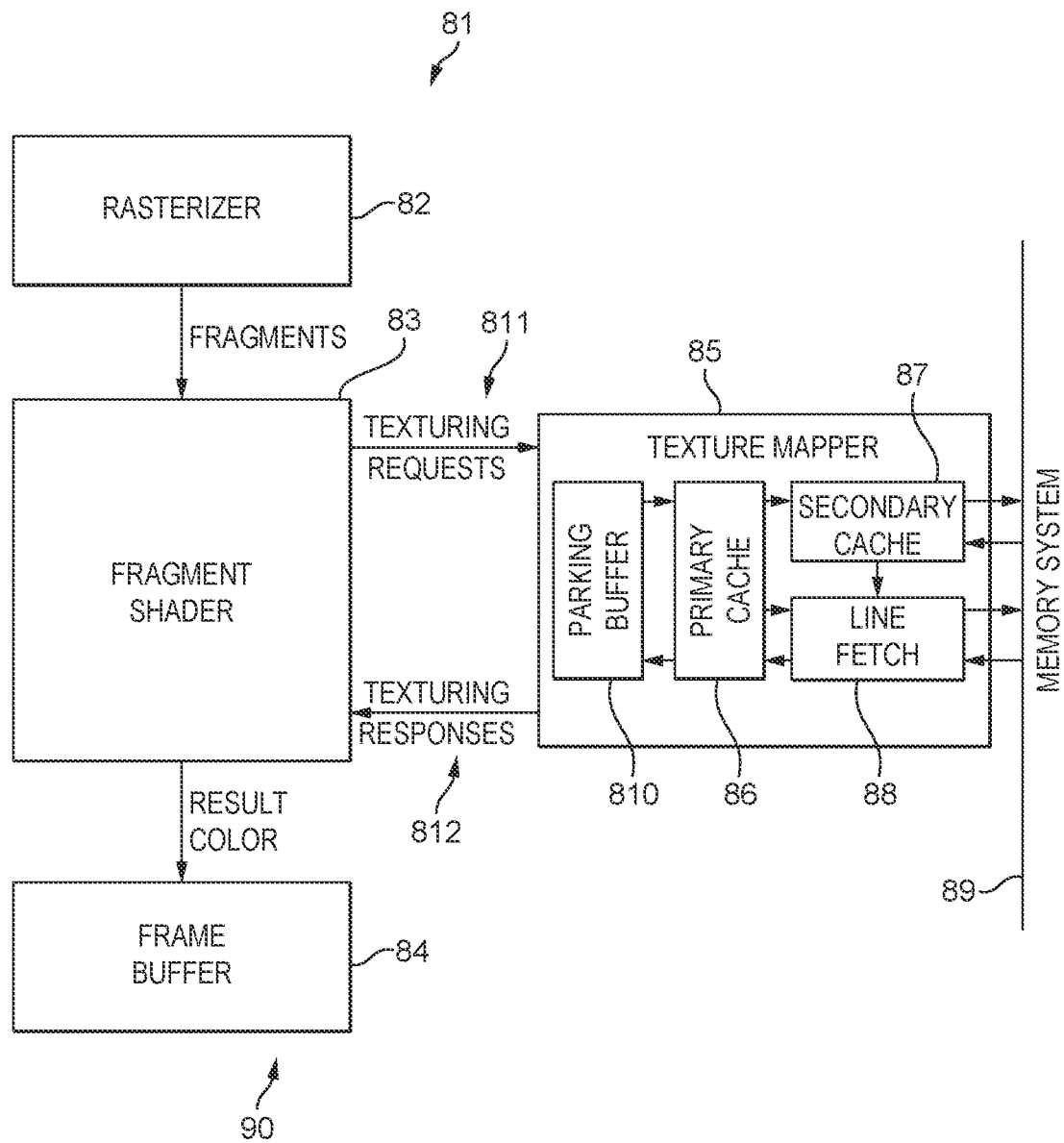
FIGS. 6 and 7 show an exemplary graphics processor that can be operated in accordance with the technology described herein.

FIG. 6 shows schematically a graphics processing system that includes a graphics processor 90 that executes a graphics processing pipeline 81 and that may be operated in accordance with the technology described herein.

The graphics processing system shown in FIG. 6 may be a tile based system (that will thus produce tiles of a render output data array, such as an output frame, to be generated). (The technology described herein is equally applicable to other systems, such as immediate mode rendering systems.) The output data array may typically be an output frame intended for display on a display device, such as a screen or printer, but may also, for example, comprise a "render to texture" output of the graphics processor, etc.

FIG. 6 shows schematically the pipeline stages after the graphics primitives (polygons) for input to the rasterisation process have been generated. Thus, at this point the graphics data (the vertex data) has undergone transformation and lighting operations (not shown), and a primitive set up stage (not shown) has set up the primitives to be rendered in response to the commands and vertex data provided to the graphics processing pipeline 81.

As shown in FIG. 6, this part of the graphics processing pipeline 81 includes a rasteriser 82 and a rendering stage (renderer) in the form of a fragment shading stage (fragment shader) 83. The graphics processor and pipeline also includes and/or has access to (is in communication with) appropriate memory 89 (of the overall graphics processing system) for storing the data that the pipeline will use and/or generate, such as a depth and stencil buffer(s), tile buffers, a frame buffer 84, texture maps, etc.

The rasteriser 82 operates to rasterise the primitives making up the render output (e.g. the image to be displayed) into individual graphics fragments for processing. To do this, the rasteriser 82 receives graphics primitives to be rendered, rasterises the primitives to sampling points and generates graphics fragments having appropriate positions (representing appropriate sampling positions) for rendering the primitives.

Fragments generated by the rasteriser 82 are sent onwards to the fragment shading stage 83 (the renderer), as shown in FIG. 6. The fragments may be subjected to early culling tests, such as depth tests, before being sent to the fragment shader 83, if desired.

The fragment shading stage 83 performs the appropriate fragment processing (rendering) operations on the fragments it receives, so as to process the fragments to generate the appropriate rendered fragment data, etc., for the render output (e.g. for display of the fragments).

This fragment processing may include any suitable and desired fragment shading processes, such as executing fragment shader programs on the fragments, applying textures to the fragments, applying blending, fogging or other operations to the fragments, etc., to generate the appropriate fragment data. In the present embodiment, the fragment shading stage 83 is in the form of a shader pipeline (a programmable fragment shader), but other arrangements, such as the use also or instead of fixed function fragment shading units would be possible, if desired.

The output fragment data values (the result colours) are written to appropriate tile buffers (not shown) that store an appropriate, e.g. colour, value for each sampling point that the buffers represent (in essence for each sampling point of the tile that is being processed). Once each tile has been processed, its data is exported from the tile buffers to a frame buffer 84 in a main memory 89 for storage, and the next tile is then processed, and so on, until sufficient tiles have been processed to generate the entire render output (e.g. frame (image) to be displayed).

The fragments may be subjected to any remaining operations necessary on the fragments, such as depth and stencil tests, blending with the framebuffer, dither, downsampling, etc. (not shown), before being written to the tile and/or frame buffers, if desired.

Other arrangements for the graphics processing pipeline 81 would, of course, be possible.

As shown in FIG. 6, as part of its operation the fragment shader 83 will use textures when shading the fragments it receives from the rasteriser 82, and as part of that texturing process will request texture sample data (texels) from a texture mapper 85 of the graphics processor.

As shown in FIG. 6, the texture mapper 85 comprises a primary, "texel" cache 86 which stores texture sample (texel) data. There is also a secondary "plane descriptor" cache 87 which stores texture plane descriptors. A line fetch pipeline 88 is operable to fetch data into both the primary cache 86 and the secondary cache 87 from the main memory 89 of or accessible to the graphics processor.

The texture mapper 85 also includes a parking buffer 810 which is used to record those texture requests from the fragment shader 83 that are awaiting the fetching of data into the primary, texel cache 86 (that have been stalled to await the fetching of data into the primary, texel cache 86). Thus texture sample requests 811 from the fragment shader 83 are "parked" in the parking buffer 810 while the cache lines that they depend on are being fetched.

The parking buffer 810 is a data structure used to record those texturing requests 811 for which data was not present in the primary, texel cache 86 when the texture sample request was made for a texturing operation by the fragment shader 83. The parking buffer 810 may be configured, for example, as a linked list of all pending texture processing operations for each outstanding cache memory transaction. As a cache memory transaction completes (the data is fetched into the cache line), the associated link list may be processed and all waiting texturing operations found and processed.

Other arrangements for the parking buffer 810 would, of course, be possible.

In this embodiment, it is assumed that the fetching of texel data into the primary, texel, cache 86 will require information in the form of a corresponding texture plane descriptor that is stored in the secondary, plane descriptor, cache 87. Thus the primary texel cache 86 and the secondary descriptor cache 87 will correspond, respectively, to the first, primary cache, and the second, secondary cache of the present embodiments and the technology described herein, and so their operation may be, and is in an embodiment, performed in the manner of the present embodiments and the technology described herein.

Figure 7:
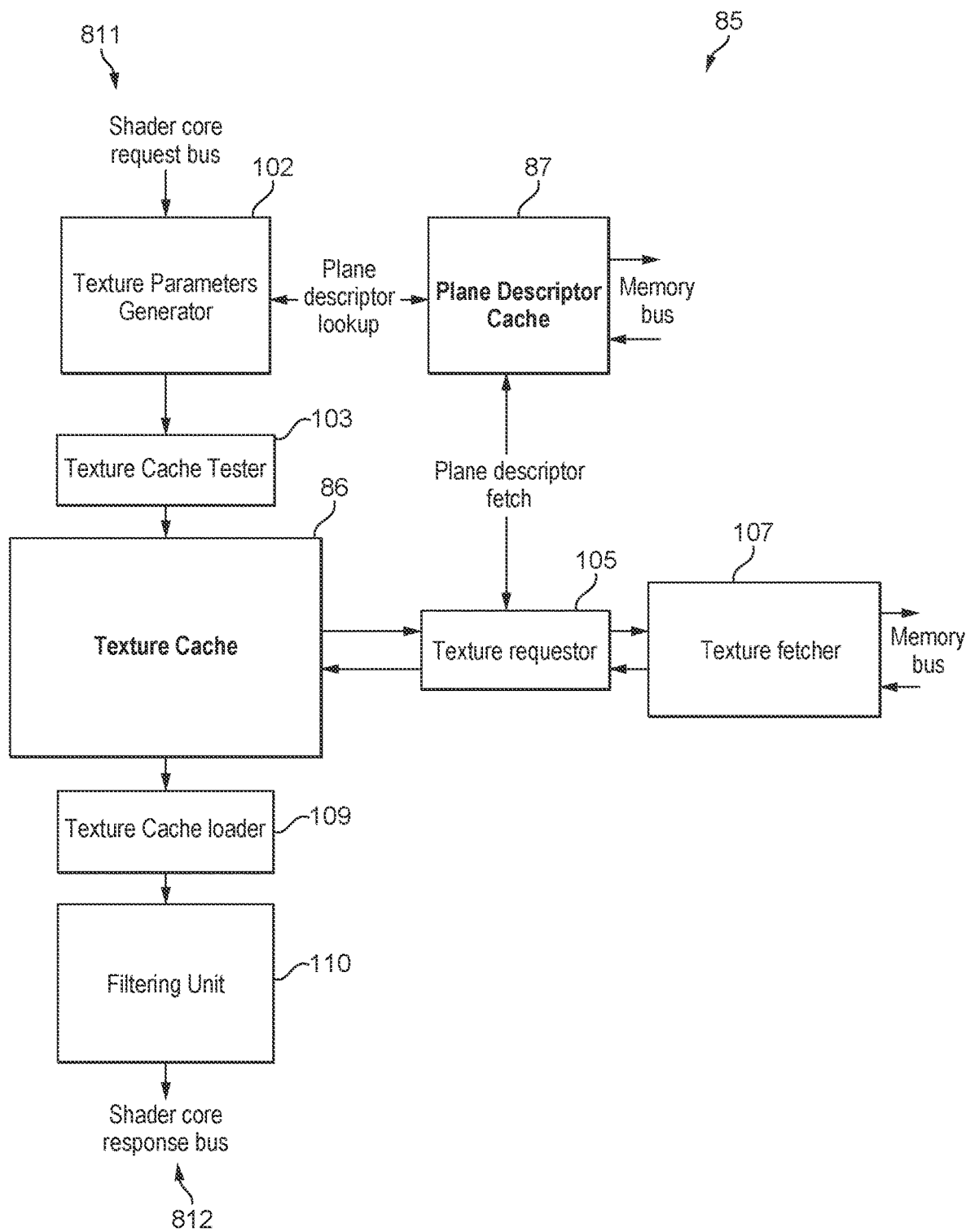

FIG. 7 shows the texture mapper 85 in more detail to illustrate this.

As shown in FIG. 7, and as discussed above, the texture mapper 85 will receive a request 811 for texture data from the fragment shader 83. This request will, inter alia, include a memory address for the plane descriptor for the texture data that is required, together with a position within the texture to be sampled.

A texture parameters generator 102 will then process the request to generate the appropriate parameters for the texture sampling and processing, such as, and in particular, determining an appropriate position or positions within the texture in question to be sampled.

As shown in FIG. 7, the texture parameters generator 102 will also, in accordance with the present embodiments, perform a look-up into the secondary plane descriptor cache 87, to identify the entry in the plane descriptor cache 87 for the plane descriptor that is required for the texture request in question. As discussed above, this look-up will, inter alia, return the index of the entry in the plane descriptor cache 87 for the plane descriptor in question.

(As shown in FIG. 7, this look-up in the plane descriptor cache 87 may also trigger the appropriate fetching of the required plane descriptor into the plane descriptor cache entry 87 where required.)

The appropriate texture request parameters, together with the returned index of the entry in the plane descriptor cache, is then provided to a texture cache tester 103, which performs a look-up in the texture cache 86 for the required texture data (in the manner discussed above).

In this case, and in accordance with the present embodiments, if there is not an appropriate entry already in the texture cache 86 for the requested texture data, then an entry will be allocated and the relevant texture data loaded from the memory in the manner of the present embodiments as discussed above.

Thus, as shown in FIG. 7, an appropriate request for the data will be sent to a texture requester 105, which will use the index of the entry in the plane descriptor cache 87 to fetch the corresponding plane descriptor from that cache, and then use that information to determine the address in memory where the required texture data is stored, and provide that information to a texture fetcher 107, which will then fetch the corresponding texture data from the memory.

Once the appropriate data is stored in the entry in the texture cache 86, then an appropriate texture cache loader 109 will perform an appropriate read from the texture cache 86 to obtain that data from the texture cache 86, and provide the texture data (the texel values) to a filtering unit 110. The filtering unit will appropriately filter (e.g. bi-linearly filter) the fetched texel values to provide the desired texture sample value requested by the fragment shader 83, and then return 812 that filtered texture value to the fragment shader 83 for use.

It should be noted here that the figures show the main elements and pipeline stages of the data, e.g. graphics, processing system that are relevant to the operation of the present embodiments. As will be appreciated by those skilled in the art there may be other elements that are not illustrated in the figures. It should also be noted here that the figures are only schematic, and that, for example, in practice the shown functional units, pipeline stages, etc., may share significant hardware circuits, even though they are shown schematically as separate stages in the figures. It will also be appreciated that each of the stages, elements and units, etc., shown in the figures may be implemented as desired and will accordingly comprise, e.g., appropriate circuits/circuitry, processing logic, etc., for performing the necessary operation and functions.

It will be appreciated from the above that the technology described herein, in its embodiments at least, can provide a more efficient mechanism for handling cache operations, in particular in the case when the loading of data into a first cache, requires data from a second cache. This is achieved, in the embodiments of the technology described herein at least, by changing the tag portion in the first, data cache in dependence upon the state of an entry in that cache, and in particular, and in an embodiment, using either an index of an entry in the second cache, or address information for data in the second cache in the tag portion of the first, data cache, in dependence upon the state of the entry in the first, data cache.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a data processing system, the data processing system comprising:
   a data processing circuit operable to perform a data processing operation;
   a first cache operable to store data for use by the data processing circuit when performing a data processing operation; and
   a second cache operable to store data required for fetching data for use in a data processing operation into the first cache from memory;
   wherein
   the first cache and the second cache each store one or more entries, wherein each entry includes a data portion and a tag portion, the tag portion for storing information for the entry in the cache that acts as an identifier for the entry in the cache;
   the method comprising:
      when it is determined in response to a request for data for a data processing operation that there is no entry for that data in the first cache:
         allocating an entry in the first cache for the requested data, and storing in the tag portion of the allocated entry information that indicates an entry in the second cache for data required for fetching the requested data;
         reading from the second cache the data required for fetching the requested data;
         after the data required for fetching the requested data has been read from the second cache: sending a request towards a memory system of the data processing system for the requested data, and replacing the information in the tag portion for the allocated entry in the first cache that indicates an entry in the second cache for data required for fetching the requested data with information indicative of an address for the data required for fetching the requested data; and
         once the requested data has been returned to the first cache, storing it in the data portion of the allocated entry in the first cache.

2. The method of claim 1, wherein the tag portion of an entry in the first cache comprises a first part that stores some information indicative of an address for data required for fetching the data for the entry in the first cache, and a further, different part, that stores either: information that indicates an entry in the second cache for data required for fetching the data for the entry in the first cache, or further information indicative of an address for the data required for fetching the data for the entry in the first cache.

3. The method of claim 1, wherein each entry in the second cache has an associated index for the entry, and the information that indicates an entry in the second cache for data required for fetching the requested data that is stored in the tag portion of an allocated entry in the first cache comprises the index for the corresponding entry in the second cache.

4. The method of claim 1, wherein the reading from the second cache of the data required for fetching the requested data comprises using the information that indicates the entry in the second cache for the data required for fetching the requested data stored in the tag portion of the allocated entry in the first cache, to identify and access the entry in the second cache for the data required for fetching the requested data.

5. The method of claim 1, comprising:
   after the data required for fetching the requested data into the first cache has been returned from the second cache, replacing the information in the tag portion of the entry in the first cache that indicates an entry in the second cache for data required for fetching the requested data with information indicative of an address of the data required for fetching the requested data that has been obtained from the tag portion of the read entry in the second cache.

6. The method of claim 1, further comprising:
in advance of making a request for data for a data processing operation in the first cache:
performing a look-up in the second cache to determine whether there is an entry in the second cache for data required for fetching the to be requested data into the first cache;
and returning in response to that look-up in the second cache information that indicates the entry in the second cache for the data required for fetching the data to be requested from the first cache into the first cache.

7. The method of claim 1, wherein the data processing system is a graphics processing system, the data processing operation is a graphics processing operation, the first cache stores texture data, and the second cache stores texture plane descriptors.

8. A method of operating a cache in a data processing system, which cache stores one or more entries, wherein each entry includes a data portion and a tag portion, the tag portion for storing information for the entry in the cache that acts as an identifier for the entry in the cache, and wherein each entry in the cache can be in one of a plurality of different entry states;
the method comprising:
storing different information in the tag portion of an entry in the cache, in dependence upon the state of the entry in the cache; and
when performing a look-up for data in the cache in response to a request for data from the cache, the look-up using an identifier that will be compared to the tag portions of entries in the cache to see if there is a match between the identifier being used for the look-up and the tag portion of an entry in the cache:
for an entry in the cache being tested for the look-up:
determining the state of the cache entry;
selecting the identifier to use for testing against the identifier information in the tag portion of the entry based on the determined state of the entry; and
comparing the selected identifier to the identifier information in the tag portion of the entry to see if there is a match or not.

9. The method of claim 8, wherein a cache entry in the cache can be in an allocated state, a requested state, a valid state or an invalid state, and the method comprises:
when it is determined that a cache entry is in an allocated state, selecting a first form of identifier to use for the look-up; and
when a cache entry is determined to be in a requested or a valid state, selecting a different identifier to use for the look-up.

10. A data processing system comprising:
a data processing circuit operable to perform a data processing operation;
a first cache operable to store data for use by the data processing circuit when performing a data processing operation; and
a second cache operable to store data required for fetching data for use in a data processing operation into the first cache from memory;
wherein
the first cache and the second cache each store one or more entries, wherein each entry includes a data portion and tag portion, the tag portion for storing information for the entry in the cache that acts as an identifier for the entry in the cache;
the data processing system further comprising at least one processing circuit configured to, when it is determined in response to a request for data for a data processing operation that there is no entry for that data in the first cache:
allocate an entry in the first cache for the requested data, and store in the tag portion of the allocated entry information that indicates an entry in the second cache for data required for fetching the requested data;
read from the second cache the data required for fetching the requested data;
after the data required for fetching the requested data has been read from the second cache: send a read request towards a memory system of the data processing system for the requested data, and replace the information in the tag portion for the allocated entry in the first cache that indicates an entry in the second cache for data required for fetching the requested data with information indicative of an address for the data required for fetching the requested data; and
once the requested data has been returned to the first cache, store it in the data portion of the allocated entry in the first cache.

11. The system of claim 10, wherein the tag portion of an entry in the first cache comprises a first part that stores some information indicative of an address for data required for fetching the data for the entry in the first cache, and a further, different part, that stores either: information that indicates an entry in the second cache for data required for fetching the data for the entry in the first cache, or further information indicative of an address for the data required for fetching the data for the entry in the first cache.

12. The system of claim 10, wherein each entry in the second cache has an associated index for the entry, and the information that indicates an entry in the second cache for data required for fetching the requested data that is stored in the tag portion of an allocated entry in the first cache comprises the index for the corresponding entry in the second cache.

13. The system of claim 10, wherein the at least one processing circuit is configured to use the information that indicates the entry in the second cache for the data required for fetching the requested data stored in the tag portion of the allocated entry in the first cache, to identify and access the entry in the second cache for the data required for fetching the requested data.

14. The system of claim 10, wherein the at least one processing circuit is configured to:
after the data required for fetching the requested data into the first cache has been returned from the second cache, replace the information in the tag portion of the entry in the first cache that indicates an entry in the second cache for data required for fetching the requested data with information indicative of an address of the data required for fetching the requested data that has been obtained from the tag portion of the read entry in the second cache.

15. The system of claim 10, wherein the at least one processing circuit is further configured to:
perform, in advance of making a request for data for a data processing operation in the first cache, a look-up in the second cache to determine whether there is an entry in the second cache for data required for fetching the to be requested data into the first cache;

and return in response to that look-up in the second cache information that indicates the entry in the second cache for the data required for fetching the data to be requested from the first cache into the first cache.

16. The system of claim 10, wherein the at least one processing circuit is configured to:
when performing a look-up for data in the first cache in response to a request for data from the first cache, the look-up using an identifier that will be compared to the tag portions of entries in the first cache to see if there is a match between the identifier being used for the look-up and the tag portion of an entry in the first cache:
for an entry in the first cache being tested for the look-up:
determine the state of the cache entry;
select an identifier to use for testing against the tag portion of the entry based on the determined state of the entry; and
comparing the selected identifier to the tag portion of the entry to see if there is a match or not.

17. The system of claim 16, wherein a cache entry in the first cache can be in an allocated state, a requested state, a valid state or an invalid state, and:
when it is determined that a cache entry is in an allocated state, a first form of identifier is selected to use for the look-up; and
when a cache entry is determined to be in a requested or a valid state, a different identifier is selected to use for the look-up.

18. The system of claim 10, wherein the data processing system is a graphics processing system, the data processing operation is a graphics processing operation, the first cache stores texture data, and the second cache stores texture plane descriptors.

19. A non-transitory computer readable medium storing computer software code which when executing on one or more processors performs a method of operating a data processing system, the data processing system comprising:

a data processing circuit operable to perform a data processing operation;
a first cache operable to store data for use by the data processing circuit when performing a data processing operation; and
a second cache operable to store data required for fetching data for use in a data processing operation into the first cache from memory;
wherein
the first cache and the second cache each store one or more entries, wherein each entry includes a data portion and a tag portion, the tag portion for storing information for the entry in the cache that acts as an identifier for the entry in the cache;
the method comprising:
when it is determined in response to a request for data for a data processing operation that there is no entry for that data in the first cache:
allocating an entry in the first cache for the requested data, and storing in the tag portion of the allocated entry information that indicates an entry in the second cache for data required for fetching the requested data;
reading from the second cache the data required for fetching the requested data;
after the data required for fetching the requested data has been read from the second cache: sending a request towards a memory system of the data processing system for the requested data, and replacing the information in the tag portion for the allocated entry in the first cache that indicates an entry in the second cache for data required for fetching the requested data with information indicative of an address for the data required for fetching the requested data; and
once the requested data has been returned to the first cache, storing it in the data portion of the allocated entry in the first cache.

* * * * *